US012025276B2

(12) United States Patent
Lee et al.

(10) Patent No.: US 12,025,276 B2
(45) Date of Patent: Jul. 2, 2024

(54) CRYOSPHERE

(71) Applicant: Cryoport, Inc., Irvine, CA (US)

(72) Inventors: Ben Lee, Corona, CA (US); Bret Bollinger, Yorba Linda, CA (US)

(73) Assignee: Cryoport, Inc., Irvine, CA (US)

(*) Notice: Subject to any disclaimer, the term of this patent is extended or adjusted under 35 U.S.C. 154(b) by 229 days.

(21) Appl. No.: 16/730,506

(22) Filed: Dec. 30, 2019

(65) Prior Publication Data

US 2020/0149685 A1 May 14, 2020

Related U.S. Application Data

(63) Continuation-in-part of application No. 15/865,589, filed on Jan. 9, 2018, now Pat. No. 11,268,655.

(51) Int. Cl.
*F17C 13/00* (2006.01)
*F17C 13/06* (2006.01)
*F17C 13/08* (2006.01)

(52) U.S. Cl.
CPC ............ *F17C 13/06* (2013.01); *F17C 13/001* (2013.01); *F17C 13/006* (2013.01); *F17C 13/086* (2013.01); *F17C 2201/0128* (2013.01); *F17C 2203/0629* (2013.01); *F17C 2221/014* (2013.01); *F17C 2223/0161* (2013.01)

(58) Field of Classification Search
CPC .................. F17C 13/006; F17C 13/086; F17C 2270/0509; F17C 2205/0107; F17C 2205/0311
See application file for complete search history.

(56) References Cited

U.S. PATENT DOCUMENTS

| | | | | |
|---|---|---|---|---|
| 1,507,370 A * | 9/1924 | Freeble | A24F 19/00 220/DIG. 13 |
| 1,816,057 A | 7/1931 | Sagar | |
| 2,722,336 A | 11/1955 | Wexler et al. | |
| 3,108,706 A | 10/1963 | Matsch et al. | |
| 3,455,480 A | 7/1969 | George | |
| 3,555,904 A | 1/1971 | Lenker | |

(Continued)

FOREIGN PATENT DOCUMENTS

| | | |
|---|---|---|
| CN | 104930347 A | 9/2015 |
| CN | 103322117 B | 1/2016 |

(Continued)

OTHER PUBLICATIONS

EP; Supplemental Search Report dated Aug. 21, 2021 in Application Serial No. EP19738000.9.

(Continued)

*Primary Examiner* — Brian M King
(74) *Attorney, Agent, or Firm* — Snell & Wilmer L.L.P.

(57) ABSTRACT

Methods, apparatus, and device, for a cryogenic storage system that stores and/or transports a liquid or gas at a temperature below ambient temperature. The cryogenic storage system has an enclosure assembly. The cryogenic storage system has a dewar that is positioned within the enclosure assembly. The enclosure assembly may comprise be configured to provide little to no friction between the dewar and the enclosure assembly. The enclosure assembly may be configured for shock absorption and/or vibration damping for the dewar during transferring of the cryogenic storage system.

14 Claims, 19 Drawing Sheets

(56) References Cited

U.S. PATENT DOCUMENTS

| | | | | |
|---|---|---|---|---|
| 3,713,560 | A | 1/1973 | Berkley | |
| 3,717,005 | A | 2/1973 | McGrew et al. | |
| 3,948,409 | A | 4/1976 | Ovchinnikov et al. | |
| 4,140,073 | A | 2/1979 | Androulakis | |
| 4,306,425 | A | 12/1981 | Sitte et al. | |
| 4,365,576 | A | 12/1982 | Cook | |
| 4,411,138 | A | 10/1983 | Leithauser et al. | |
| 4,455,842 | A | 6/1984 | Granlund | |
| 4,694,655 | A | 9/1987 | Seidel et al. | |
| 4,729,494 | A | 3/1988 | Peillon et al. | |
| 4,790,141 | A | 12/1988 | Glascock | |
| 4,919,300 | A | 4/1990 | Anderson et al. | |
| 5,219,058 | A | 6/1993 | Sundseth | |
| 5,619,857 | A | 4/1997 | Caldwell | |
| 6,186,356 | B1 | 2/2001 | Berkley et al. | |
| 6,467,642 | B2 | 10/2002 | Mullens et al. | |
| 6,490,880 | B1 | 12/2002 | Walsh | |
| 6,539,360 | B1 | 3/2003 | Kadaba | |
| 6,673,594 | B1 | 1/2004 | Owen et al. | |
| 7,627,926 | B2 | 12/2009 | Williams | |
| 7,881,987 | B1 | 2/2011 | Hart | |
| 8,220,107 | B2 | 7/2012 | Williams | |
| 8,387,818 | B2 | 3/2013 | Cognard | |
| 8,397,343 | B2 | 3/2013 | Williams | |
| 9,139,351 | B2 | 9/2015 | Chou | |
| 9,292,824 | B1 | 3/2016 | Freeman | |
| 9,378,442 | B2 | 6/2016 | Barnings | |
| 2002/0083718 | A1 | 7/2002 | Emmel | |
| 2002/0084277 | A1 | 7/2002 | Mullens et al. | |
| 2002/0099567 | A1 | 7/2002 | Joao | |
| 2002/0102992 | A1 | 8/2002 | Koorapaty | |
| 2002/0113070 | A1 | 8/2002 | Emmel | |
| 2002/0166326 | A1 | 11/2002 | Giesy et al. | |
| 2002/0167500 | A1 | 11/2002 | Gelbman | |
| 2003/0137968 | A1 | 7/2003 | Lareau et al. | |
| 2004/0215532 | A1 | 10/2004 | Boman | |
| 2004/0236635 | A1 | 11/2004 | Publicover | |
| 2005/0046584 | A1 | 3/2005 | Breed | |
| 2005/0171738 | A1 | 8/2005 | Kadaba | |
| 2005/0234785 | A1 | 10/2005 | Burman | |
| 2005/0246192 | A1 | 11/2005 | Jauffred et al. | |
| 2006/0080819 | A1 | 4/2006 | McAllister | |
| 2006/0121437 | A1 | 6/2006 | Poo et al. | |
| 2006/0168644 | A1 | 7/2006 | Richter et al. | |
| 2007/0009119 | A1 | 1/2007 | Pohle et al. | |
| 2007/0028642 | A1 | 2/2007 | Glade et al. | |
| 2007/0209376 | A1 | 9/2007 | Boer | |
| 2007/0268138 | A1 | 11/2007 | Chung et al. | |
| 2008/0094209 | A1 | 4/2008 | Braun | |
| 2008/0162304 | A1 | 7/2008 | Ourega | |
| 2008/0291033 | A1 | 11/2008 | Aghassipour | |
| 2009/0014537 | A1 | 1/2009 | Gelbman | |
| 2009/0045311 | A1* | 2/2009 | Seyedin | F16M 11/08<br>248/349.1 |
| 2009/0293524 | A1 | 12/2009 | Vezina et al. | |
| 2009/0314835 | A1 | 12/2009 | Jackson | |
| 2010/0080168 | A1 | 4/2010 | Fukuyama | |
| 2010/0299278 | A1 | 11/2010 | Kriss et al. | |
| 2011/0140850 | A1 | 6/2011 | Wassel | |
| 2011/0155745 | A1 | 6/2011 | Chou et al. | |
| 2011/0210029 | A1 | 9/2011 | Ontjes | |
| 2011/0216178 | A1 | 9/2011 | Carpenter | |
| 2011/0281352 | A1 | 11/2011 | Raeder et al. | |
| 2013/0014517 | A1 | 1/2013 | Diederichs et al. | |
| 2014/0270928 | A1* | 9/2014 | Howard | F16K 1/00<br>403/327 |
| 2015/0257558 | A1 | 9/2015 | May | |
| 2016/0003270 | A1 | 1/2016 | Franklin | |
| 2016/0078987 | A1 | 3/2016 | Simpkins | |
| 2016/0153665 | A1 | 6/2016 | Adeleye | |
| 2019/0211971 | A1 | 7/2019 | Bollinger et al. | |
| 2019/0248562 | A1 | 8/2019 | Marotta | |
| 2020/0017817 | A1* | 1/2020 | Kelly-Greene | C12M 41/18 |
| 2022/0186885 | A1 | 6/2022 | Bollinger et al. | |

FOREIGN PATENT DOCUMENTS

| | | | | |
|---|---|---|---|---|
| CN | 106005766 | A | 10/2016 | |
| CN | 208881873 | U | 5/2019 | |
| DE | 102015205969 | A1 | 10/2016 | |
| EP | 2576384 81 | | 7/2014 | |
| EP | 3620233 | A1 | 3/2020 | |
| FR | 585827 | A | 3/1925 | |
| GB | 2494651 | A | 3/2020 | |
| JP | S5390123 | U | 7/1978 | |
| JP | H0712295 | A | 1/1995 | |
| JP | H0958714 | A | 3/1997 | |
| JP | 09-329297 | | 12/1997 | |
| JP | 2001180797 | A | 7/2001 | |
| JP | 2004-517007 | A | 6/2004 | |
| JP | 2006016044 | A | 1/2006 | |
| JP | 2012163129 | A | 8/2012 | |
| JP | 2014-527610 | A | 10/2014 | |
| JP | 2015048925 | A | 3/2015 | |
| JP | 3958213 | | 5/2018 | |
| NL | 1033089 | C2 | 6/2008 | |
| SU | 1321986 | A1 | 7/1987 | |
| TW | 201708531 | A1 | 3/2017 | |
| WO | 2002053967 | | 11/2002 | |
| WO | 2011/147384 | | 12/2011 | |
| WO | WO-2011147384 | A2 * | 12/2011 | B65D 77/0473 |
| WO | WO2016086143 | | 6/2016 | |
| WO | WO 2020049123 | A1 | 3/2020 | |

OTHER PUBLICATIONS

USPTO; Final Office Action dated Aug. 21, 2020 in U.S. Appl. No. 15/865,589.

PCT: International Preliminary Report on Patentability dated Jul. 14, 2020 in PCT Application No. PCT/US2019/012553.

CN; Notice of First Office Action dated Oct. 25, 2021 in Chinese Application No. 201980011145.2.

USPTO; Notice of Allowance dated Dec. 22, 2022 in U.S. Appl. No. 15/865,589.

SG; Search Report & Written Opinion dated Oct. 28, 2021 in Application Serial No. SG11202006224Y.

USPTO; Non-Final Office Action dated Dec. 2, 2011 in U.S. Appl. No. 12/658,641.

USPTO; Final Office Action dated Aug. 14, 2012 in U.S. Appl. No. 12/658,641.

USPTO; Non-Final Office Action dated Sep. 11, 2015 in U.S. Appl. No. 12/658,641.

USPTO; Non-Final Office Action dated Dec. 2, 2012 in U.S. Appl. No. 12/852,413.

USPTO; Final Office Action dated May 10, 2012 in U.S. Appl. No. 12/852,413.

USPTO; Advisory Action dated Jul. 31, 2012 in U.S. Appl. No. 12/852,413.

USPTO; Non-Final Office Action dated Jun. 18, 2014 in U.S. Appl. No. 12/852,413.

USPTO; Non-Final Office Action dated Jun. 17, 2016 in U.S. Appl. No. 12/852,413.

USPTO; Final Office Action dated Nov. 29, 2016 in U.S. Appl. No. 12/852,413.

USPTO; Non-Final Office Action dated Jul. 25, 2017 in U.S. Appl. No. 14/589,768.

USPTO; Final Office Action dated Feb. 7, 2018 in U.S. Appl. No. 14/589,768.

USPTO; Non-Final Office Action dated Jun. 19, 2018 in U.S. Appl. No. 14/589,768.

USPTO; Final Office Action dated Dec. 27, 2018 in U.S. Appl. No. 14/589,768.

USPTO; Non-Final Office Action dated Aug. 9, 2019 in U.S. Appl. No. 15/865,589.

USPTO; Final Office Action dated Nov. 29, 2019 in U.S. Appl. No. 15/865,589.

PCT; International Search Report dated May 31, 2002 in International Application No. PCT/US2001/049684.

(56) References Cited

OTHER PUBLICATIONS

PCT; International Search Report dated Jun. 28, 2010 in International Application No. PCT/US2010/023252.
PCT; Written Opinion of International Search Authority dated Jun. 28, 2010 in International Application No. PCT/US2010/023252.
PCT; International Preliminary Report on Patentability dated Mar. 22, 2013 in International Application No. PCT/US2010/023252.
Electronic Reusable Paper, http://www2.parc.com/hsl/projects/gyricon/, (Oct. 2005).
PCT; International Search Report & Written Opinion dated Mar. 23, 2021 in PCT Application No. US2020/063823.
USPTO; Non-Final Office Action dated Apr. 3, 2020 in U.S. Appl. No. 15/865,589.
PCT: International Search Report & Written Opinion dated May 8, 2019 in PCT Application No. PCT/US2019/012553.
Screenshot (1 pg.) of YouTube Video entitled "Upright Positioner"; WAK Chemie Medical GmbH Germany, published on Dec. 16, 2011; retrieved on Mar. 31, 2020 from URL: https://www.youtube.com/watch?v=LJeUh_pn2Mo.
PCT; International Preliminary Report on Patentability dated Jul. 5, 2022 in PCT Application No. PCT/US2020/063823.
UK; 2nd Examination Report dated Jul. 29, 2022 in Application No. GB2012312.1.
CN; 2nd Examination Report dated May 10, 2022 in Application No. 201980011145.2.
JP; Notice of Allowance dated Aug. 26, 2022 in Application No. 2020-557129.
UK; First Examination Report dated Feb. 16, 2022 in application No. 2012312.1.
JP; First Examination Report dated Feb. 28, 2022 in application No. 2020-557129.
GB; Examination Report dated Jan. 9, 2023 in Application No. 2012312.1.
JP; Examination Report dated Feb. 2, 2023 in Application No. 2022-145286.
EP; Supplemental Search Report dated Oct. 25, 2022 in EP20909114.9.
CN; Notice of Allowance dated Nov. 4, 2022 in Application No. 201980011145.2.
SG: 2nd Written Opinion dated Mar. 1, 2023 in Singapore Application Serial No. 11202006224.
UK: 1st Examination Report dated Mar. 27, 2023 in UK Application Serial No. 2210923.5.
CH: 1st Office Action dated Mar. 9, 2023 in Switzerland Application Serial No. CH00012212022.
AU; Notice of the First Office Action dated Nov. 7, 2023 in Application No. 2019207475.
UK; Notice of Intent to Grant dated Oct. 10, 2023 in Application No. 2210923.5.
UKIPO; Intention to Grant dated Mar. 23, 2023 in Application No. GB2012312.1.
JPO; Notice of Allowance dated Sep. 7, 2023 in Application No. 2022-145286.
CNIPA; Notice on the First Office Action dated Aug. 31, 2023 in Application No. 202080091726.4.
USPTO; Notice of Allowance dated Sep. 13, 2023 in U.S. Appl. No. 17/685,915.
AGIPA; Notice of Acceptance dated Jan. 31, 2024 for Application No. 2019207475.
EPO; First Examination Report dated Feb. 7, 2024 for Application No. 19738000.9-1015.
JP; Notice of Allowance dated Sep. 7, 2023 in Application No. 2022-145286.
CH; 2nd Office Action dated Sep. 14, 2023 in Application No. CH00012212022.
GB; Combined Search Report and Examination Report dated Dec. 11, 2023 in GB2317085.5.

* cited by examiner

CRYOSPHERE

CROSS-REFERENCE TO RELATED APPLICATIONS

This application is a continuation-in-part of, and claims priority to, and the benefit of U.S. Non-Provisional application Ser. No. 15/865,589, entitled "CRYOSPHERE," filed on Jan. 9, 2018, which is hereby incorporated by reference in its entirety.

BACKGROUND

Field

This specification relates to a system, device or apparatus for cryogenically storing, transporting and/or shipping a liquid or gas below ambient temperatures.

Description of the Related Art

Lab technicians, scientists, medical professionals, such as doctors or nurses, and other technicians may cryogenically store and transport commodities, utilizing liquids or gases for temperature control, to various facilities, such as hospitals, labs and/or research facilities. During transportation of the commodities, the commodities are kept at cryogenic temperatures. Additionally, the technicians and/or professionals store the commodities in a dewar, which is used to hold the commodity at a refrigerated or cryogenic temperature. The dewar may take several different forms including open buckets, flasks and/or self-pressurizing tanks. The dewar may be a double-walled metal or glass flask that has a vacuum between the walls. This provides thermal insulation between the walls.

The technician or professional may fill the dewar with the commodity, as well as liquid or gas, and package the dewar using shipping material. Then, the technician or professional provides the package including the dewar to a shipper to transport the contents to the final destination where it is unpacked. The liquid or gas, however, slowly boils so the dewar may have an opening on top, which is designed to allow the gas to escape. In addition, while being shipped, the dewar may be tilted or overturned resulting in the liquid or gas flowing out of the dewar.

Accordingly, there is a need for a system, device or apparatus to protect the liquid or gas in the dewar from evaporation and from pouring out while being transported.

SUMMARY

In general, one aspect of the subject matter described in this specification is embodied in a cryogenic storage system. The cryogenic storage system ("storage system") stores and/or transports a liquid or a gas. The storage system has an enclosure assembly configured to receive a dewar. The storage system has the dewar that is positioned within the enclosure assembly. The enclosure assembly is configured to provide little to no friction on an outer surface of the dewar as the dewar rotates during transportation of the storage system. The enclosure assembly is configured for shock absorption and/or vibration dampening of the dewar during transportation of the storage system.

These and other embodiments may optionally include one or more of the following features. The enclosure assembly may comprise an outer dome. The outer dome may comprise a plurality of ball elements disposed therein. The dewar may be positioned on the plurality of ball elements and only contact the ball elements during transportation of the storage system. The outer dome may be placed between a first enclosure and a second enclosure. The first enclosure and the second enclosure may each be coupled to a padding component. The padding component may be configured for shock absorption and/or vibration dampening.

The enclosure assembly may comprise various components configured for shock absorption and/or vibration dampening. The enclosure assembly may comprise padding components, a net assembly, a net and spring assembly, a support tube assembly including support tubes with nitrogen gas, or the like.

The enclosure assembly may comprise various components configured to provide little to no friction between the component and the spherical dewar. The enclosure assembly may comprise a plurality of pad assemblies, a plurality of ball bearings, a plurality of transfer rollers, a plurality of ball transfer devices, a plurality of ball elements or the like.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses and devices for transporting and storing a liquid or gas, such as liquid nitrogen. The system, apparatus or device may be a cryogenic storage system that stores and transports liquid. Particular embodiments of the subject matter described in this specification may be implemented to realize one or more of the following advantages.

The cryogenic storage system may have an enclosure that is made from a polymeric material so that the enclosure is able to withstand cryogenic temperatures. That is, the polymeric material is resistant to brittleness and not as susceptible to shattering at cryogenic temperatures. The enclosure may hold or suspend a dewar that contains the liquid or gas. Moreover, the enclosure surrounds the dewar to protect the dewar from any impacts. The enclosure may freely suspend or hold the dewar, such that the dewar freely rotates and/or moves about within the enclosure without impacting the inner sides of the enclosure. Moreover, the dewar may be spherical and have passive stabilization. That is, the dewar may have a center of mass that is located directly opposite from the opening and a center of gravity that is at or near the bottom of the dewar near the center of mass so that the dewar remains in or returns to an upright or vertical position when tilted. By being able to freely rotate within the enclosure and by having passive stabilization, the dewar remains upright regardless of the orientation of the enclosure to prevent spillage. Moreover, by stabilizing the dewar upright, the cryogenic storage system reduces the amount of evaporation of the liquid within the dewar. For example, the cryogenic storage system reduces the nitrogen evaporation rate within the dewar, which extends the life of the dewar in a shipment.

Other benefits and advantages include that the enclosure has multiple faces that provide access to the dewar, which improves physical access to the opening of the dewar for inserting and/or removing the liquid or gas. Additionally, the dewar may have an electronic device that conveys and monitors the temperature inside the dewar and has a connection device that reduces the amount of friction between the enclosure and the dewar when the dewar freely rotates.

Figure 1:
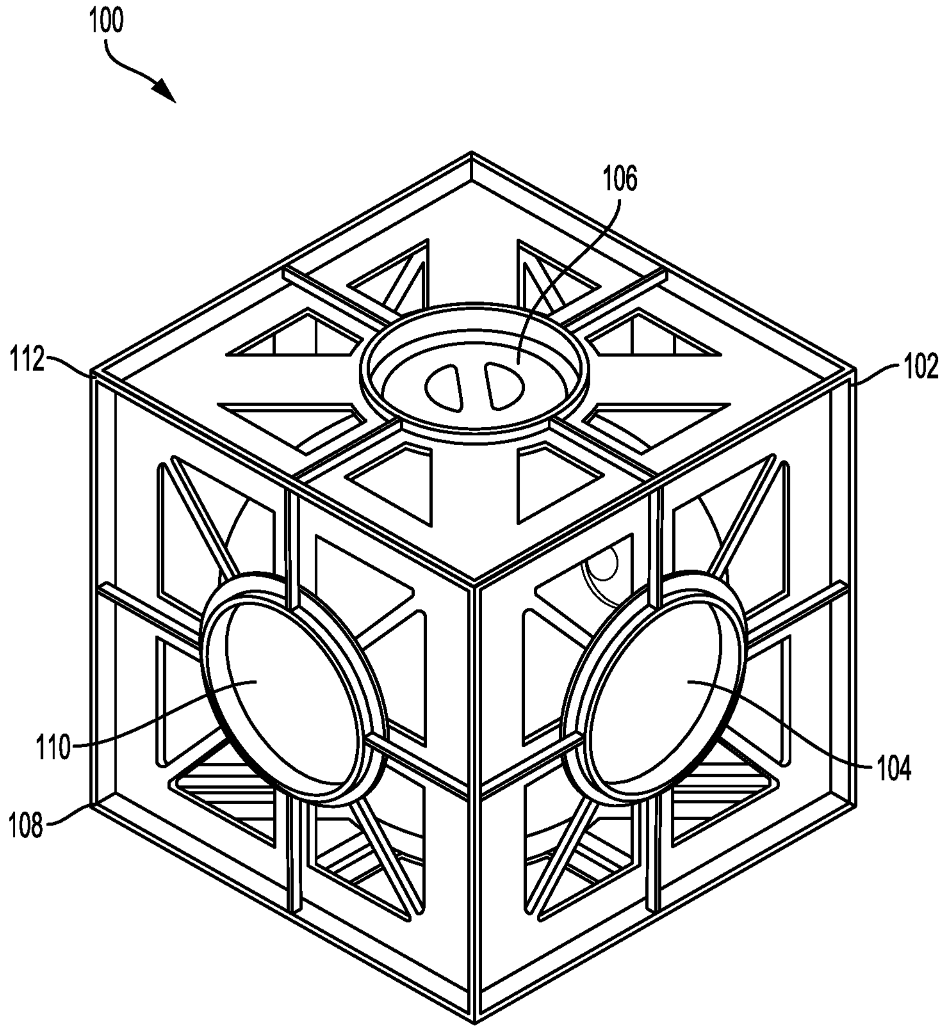
FIG. 1 shows an example cryogenic storage system according to an aspect of the invention.
Figure 2:
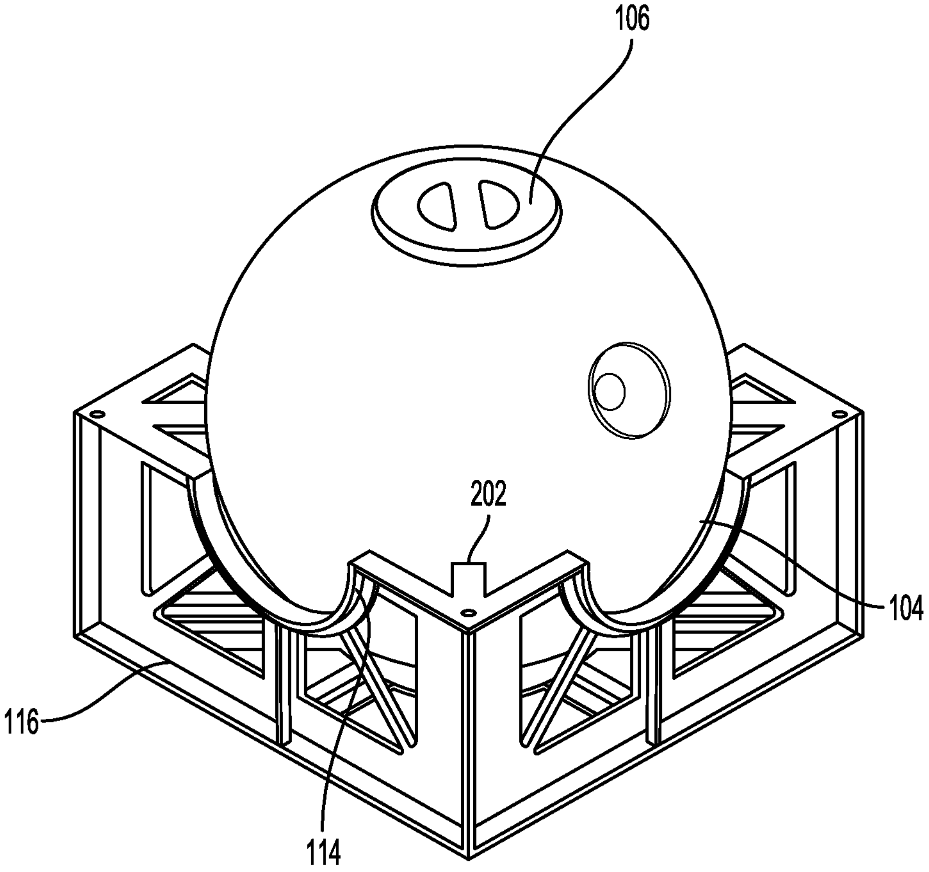
FIG. 2 shows a spherical dewar situated within the enclosure according to an aspect of the invention.

FIG. 1 shows a perspective view of the cryogenic storage system 100, and FIG. 2 shows a cross-sectional view of the cryogenic storage system 100, in accordance with various embodiments. The cryogenic storage system ("storage system") 100 includes an enclosure 102, a dewar 104, such as a double-walled flask, and a vapor plug 106. The enclosure 102 is three-dimensional (3D) and may be shaped as a cube. The enclosure 102 may be shaped as any type of three-dimensional object, such as a cube, tetrahedron, dodecahedron or octahedron, and may be made from a polymeric material so that the enclosure 102 does not shatter at cryogenic temperatures.

The enclosure 102 has multiple sides 108 or faces. The sides 108 form a closed enclosure that surrounds or encloses the dewar 104. The sides 108 may be a planar or latticed surface that connects to the other sides to form the enclosure 102 and surround the dewar 104. The dewar 104 inserted into or placed into a cavity of the enclosure 102 so that the dewar 104 resides within the enclosure 102. The multiple sides 108 may snap together using one or more fasteners. The multiple sides 108 may snap together at one or more corners 112, for example. In some implementations, the enclosure may be formed from multiple modular pieces. The multiple modular pieces may be connected and/or fastened together to form the enclosure 102. The multiple sides may have one or more enclosure openings 110. The one or more enclosure openings 110 may be circular and/or shaped in the same shape as the dewar opening. The one or more enclosure openings 110 provide access to the dewar 104 as the dewar 104 rotates within the enclosure 102. Thus, the opening 402 of the dewar 104 may be access regardless of the orientation of the enclosure 102.

For example, the enclosure 102 is shaped as a cube and has 6 sides 108. Each side is connected to at least another side at a corner 112. On each side, there is an enclosure opening 110. The enclosure opening allows access to the vapor plug 106 and the dewar opening, when the dewar opening is aligned with the enclosure opening 110 on the side of the enclosure 102. Thus, as the dewar rotates within the cavity of the enclosure, the one or more enclosure openings 110 provide access to the vapor plug 106 and the dewar opening, when the one or more enclosure openings 110 align with the dewar opening.

The enclosure 102 may have an inner framework 114 and an outer framework 116. The outer framework 116 protects the dewar 104 from impacts, vibration and/or shocks. For example, the outer framework 116 separates the dewar 104 from other objects, such as other boxes or the side of a truck, when the enclosure 102 is shipped or stored. The inner framework 114 forms the cavity within the enclosure 102 where the dewar 104 is situated. The dewar may be suspended, placed or otherwise situated within the cavity of the inner framework 114 so that the dewar 104 is able to rotate within the cavity.

Figure 9:
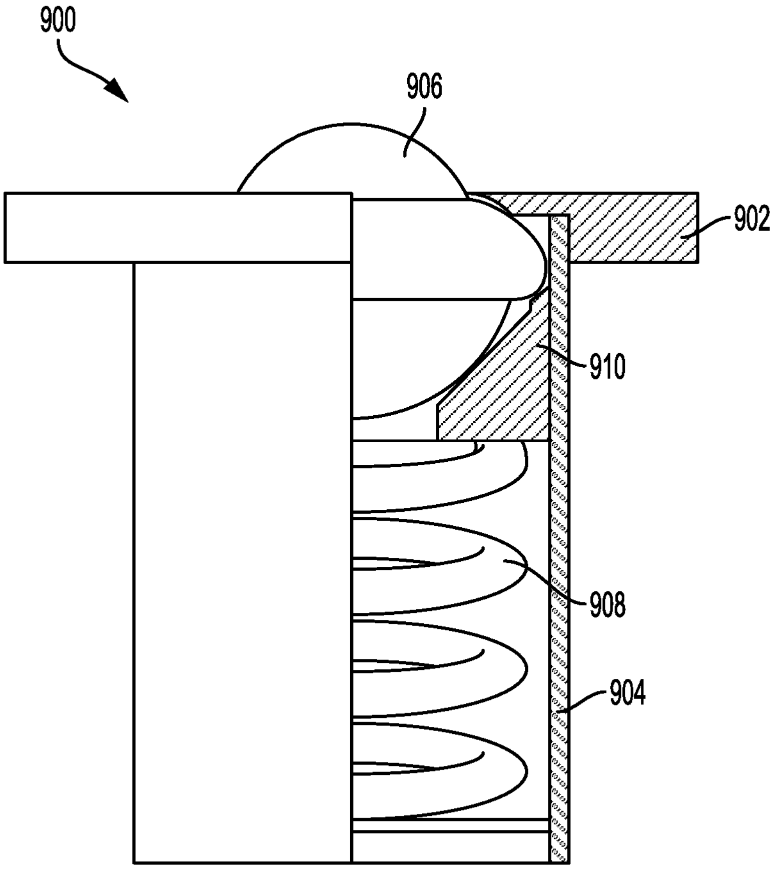
FIG. 9 is an example ball transfer device of the cryogenic storage system of FIG. 1 according to an aspect of the invention.

The storage system 100 may include a ball transfer device 900 that is connected between the enclosure 102 and the dewar 104. The ball transfer device 900 facilitates the movement of the dewar relative to the enclosure 102. The ball transfer device 900 may be positioned at an inner phalange or wing 202 that is between the enclosure 102 and the dewar and provide for a frictionless or near-frictionless surface. The ball transfer device 900 minimizes or eliminates friction between the dewar and the enclosure 102, which allows the dewar to freely move or rotate within the enclosure 102. FIG. 9 further describes the structure of the ball transfer device 900.

Figure 3:
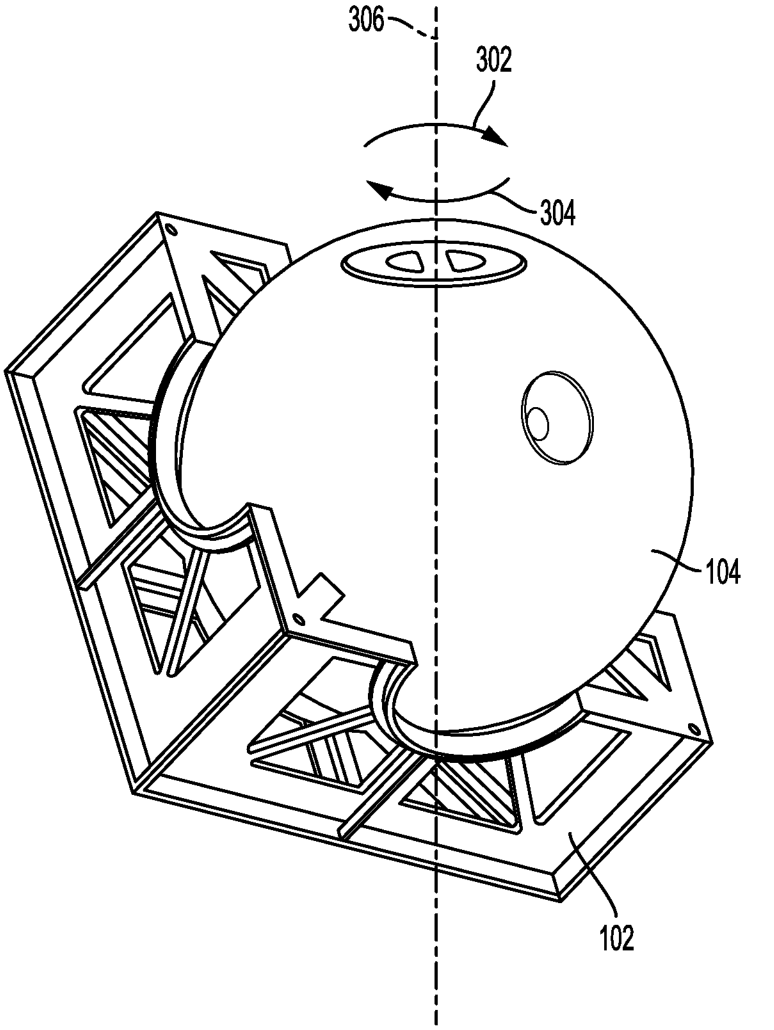
FIG. 3 shows the spherical dewar rotating within the enclosure according to an aspect of the invention.

The storage system 100 includes a dewar 104. The dewar 104 may be double-walled flask and may be shaped as a sphere or any other polyhedron. The dewar 104 may be situated centrally within a central cavity of the enclosure 102 and may freely rotate and/or move within the central cavity. The dewar 104 may rotate in the direction 302, 304 about a central vertical axis 306 or in any other direction three-dimensionally, as shown in FIG. 3 for example.

Figure 4:
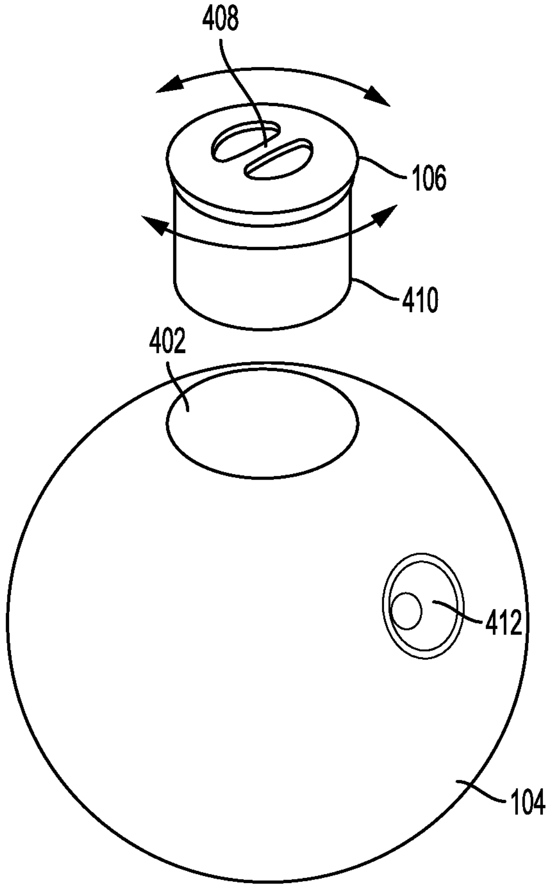
FIG. 4 shows an opened spherical dewar to allow the liquid or gas to be inserted according to an aspect of the invention.
Figure 5:
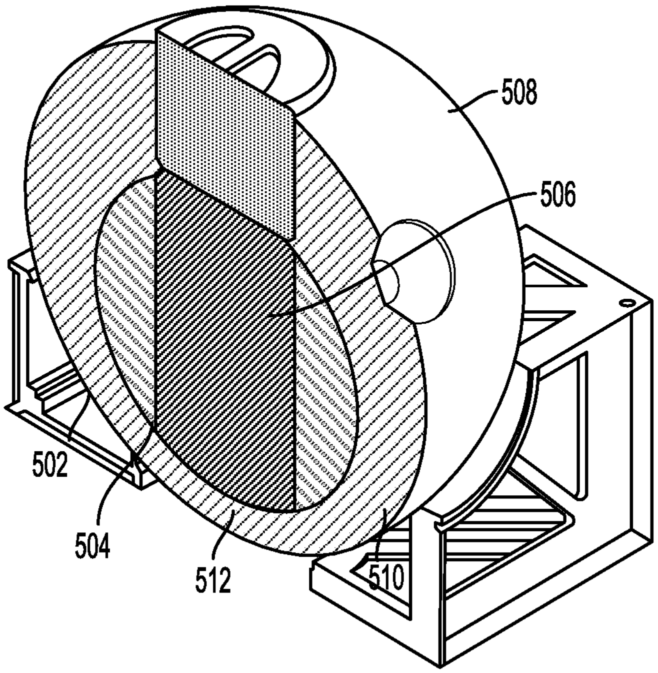
FIG. 5 shows a cross-sectional view of the cryogenic storage system of FIG. 1 according to an aspect of the invention.

The dewar 104 has an inner wall 504, an outer wall 502 and an opening 402. The storage system 100 may have a plug, such as the vapor plug 106, which may be inserted into the opening 402 to seal or partially seal the dewar 104 while allowing some gas to escape, as shown in FIG. 4 for example. The opening 402 leads to a cavity or payload area 506 that is within the dewar 104. FIG. 5 shows the payload area 506 in the cross-sectional view of the dewar 104. The dewar 104 may form a vacuum between the inner wall 504 and the outer wall 502 to hold or store a liquid or gas below ambient temperatures. The dewar 104 may have a pump-out port 412. The pump-out port 412 may be used to create a vacuum between the inner wall 504 and the outer wall 502 of the dewar 104, which allows the space in between the inner wall 504 and the outer wall 502 to be completely evacuated.

The dewar 104 has an inner wall 504 and an outer wall 502 with a vacuum between the inner wall 504 and the outer wall 502. The outer wall 502 has an opening 402 that allows a liquid or gas to be inserted or placed into the payload area 506. The opening 402 may be positioned opposite the center of gravity or mass 512 of the dewar 104, such that the opening 402 remains upright when the dewar 104 is passively stabilized. The opening 402 allows gases to escape from the payload area 506 of the dewar 104 to relieve the gas expansion within the dewar 104.

The inner wall 504 forms and/or encloses the payload area 506 within the dewar 104. The payload area 506 may be a cylindrical cavity within the dewar 104 that extends longitudinally from the top portion 508 through to the bottom portion 510 of the dewar 104. The payload area 506 holds or stores the liquid or gas below ambient temperatures. An absorbent material 606 may be at or surrounding a bottom portion of the payload area 506. The absorbent material 606 may maintain the temperature within the payload area 506 below the ambient temperature.

Figure 6A:
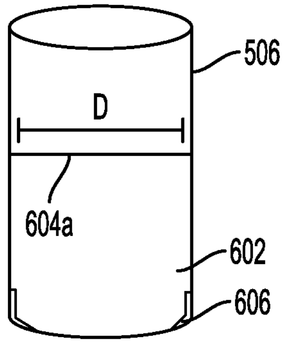
FIGS. 6A-6C show the liquid or gas within the payload area in different orientations according to an aspect of the invention.
Figure 6B:
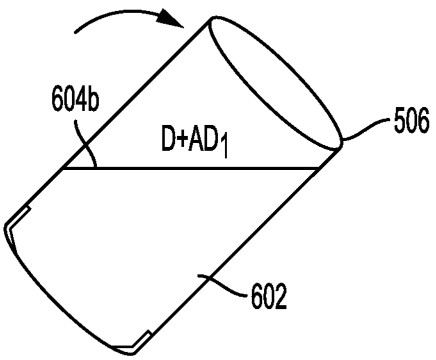
Figure 6C:
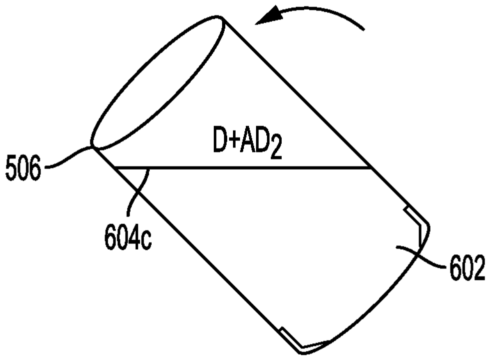

The dewar 104 has a top portion 508 and a bottom portion 510. The top portion 508 is where the opening 402 is located and remains upright due to passive stabilization of the dewar 104. The bottom portion 510 includes the center of gravity or mass 512. Since the center of gravity or mass 512 is located within the bottom portion 510 of the dewar 104, the dewar 104 stabilizes around the center of gravity or mass 512 so that the dewar 104 remains upright. By stabilizing the dewar 104 around the center of gravity or mass 512 regardless of the orientation of the enclosure 102, the storage system 100 reduces the amount and/or rate of evaporation of the liquid or gas and/or absorbent material, e.g., the nitrogen evaporation rate is reduced. The amount and/or rate of evaporation of the liquid or gas and/or absorbent material is based on the amount of the cross-sectional surface area 604*a-c* of the liquid or gas 602, as shown in FIGS. 6A-6C for example. Additionally, by having passive stabilization, the dewar 104 increases an amount of shipping density within a shipping container, as the dewar 104 may be enclosed in an enclosure 102 of any shape which allows the shipper to use any shape for the enclosure 102 that best fits the available space or empty volume within the shipping container.

FIG. 6A shows the liquid or gas 602 and the absorbent material 606 within the payload area 506 of the dewar 104 when the dewar 104 is upright. The absorbent material 606 may be positioned within or surrounding the bottom portion of the payload area 506 of the dewar 104. The cross-sectional surface area 604*a* of the liquid or gas 602 has a diameter, D, when the dewar 104 is upright because the payload area 506 is upright or vertical. If the payload area 506 were to be angled or tilted, as shown in FIGS. 6B and 6C for example, the liquid or gas 602 would have cross-sectional surface areas 604*b-c* of D+ΔD, respectively, that are greater than the cross-sectional surface area 602*a*, D, when the payload area 506 is upright or vertical. As the payload area 506 tilts or angles, the shape of the cross-sectional surface area 604*a* transitions from a circular shape due to the cylindrical nature of the payload area 506 to the elliptical shape of the cross-sectional surface areas 604*b-c*. The size of the elliptical cross-sectional surface areas 604*b-c* increase as the angle increases. The increased cross-sectional surface areas 602*b-c* result in an increased evaporation rate and/or amount of the liquid or gas 602 and/or an increased burn rate or amount of the absorbent material 606. The increased cross-sectional surface areas 604*b-c* expose more of the liquid or gas 602 to a higher temperature medium causing a faster burn rate for the absorbent material 606 to cool the liquid or gas 602. Moreover, the liquid and/or gas may spill out or escape from the opening 402 of the dewar 104 as the payload area 506 is tilted. Additionally, as liquid or gas 602 spills out and/or the cross-sectional surface area 602*b-c* increases, a partial vacuum is created, which draws in warm air that further increases the average temperature and causes a faster burn rate for the absorbent material 606 to cool the liquid or gas 602.

Since the dewar 104 within the storage system 100 has passive stabilization that maintains the dewar 104 in the upright position regardless of the orientation of the enclosure 102, the payload area 506 within the dewar 104 maintains the upright position or returns to the upright position when the dewar 104 is tilted, rotated and/or otherwise angled. Thus, the storage system 100 reduces the amount and/or rate of evaporation of the liquid or gas 602 and reduces the burn rate of the absorbent material 606 by maintaining the dewar 104 in the upright position and/or passively adjusting the dewar 104 so that the dewar 104 returns to or maintains the upright and/or vertical position. Moreover, by reducing the burn rate of the absorbent material 606, which may be nitrogen, the dynamic holding time of the dewar 104 increases. The dynamic holding time is the time that the dewar 104 maintains the internal temperature at or below −150° C. during transportation.

The storage system 100 includes a vapor plug 106. FIGS. 4, 7A and 7B show the vapor plug 106. The vapor plug 106 may have a handle portion 408 and a neck 410. The handle portion 408 may have a handle or grip that allows a user to twist the vapor plug 106 in a clockwise or counter clockwise direction to insert at least a portion of the neck 410 into the opening 402. The vapor plug 106 may be removable. That is, the vapor plug 106 may be inserted into the opening 402 of the dewar 104 to close or partially close the dewar 104 and prevent access to the payload area 506. The handle portion 408 and/or the neck 410 may be made from a non-conductive material, such as a polymer or fiberglass like material.

The vapor plug 106 may be turned or twisted clockwise and/or counter-clockwise, as shown in FIG. 4 for example. For example, the vapor plug 106 may be turned clockwise when inserted into the opening 402 to secure the vapor plug 106 within the opening 402 and turned counter-clockwise to remove the vapor plug 106 from the opening 402 to allow insertion of the liquid or gas into the payload area 506. In another example, the vapor plug 106 may be turned counter-clockwise when inserted into the opening 402 to secure the vapor plug 106 within the opening 402 and turned clockwise to remove the vapor plug 106 from the opening 402. The vapor plug 106 may be inserted into the opening 402 such that there remains a gap that allows gas to escape to prevent pressure from building up as the liquid within the payload area 506 evaporates.

Figure 7:
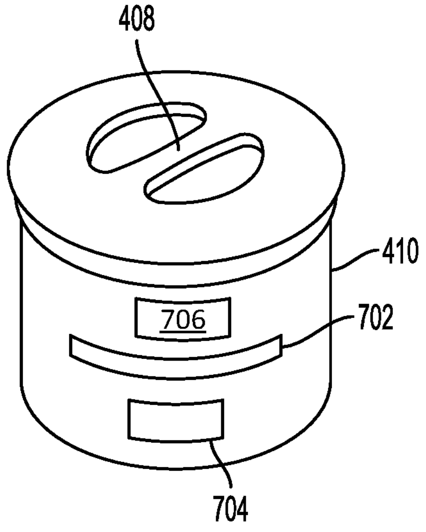
FIG. 7 is an example vapor plug of the cryogenic storage system of FIG. 1 according to an aspect of the invention.

The vapor plug 106 may have a locking device 704, as shown in FIG. 7. The locking device 704 may be positioned on the neck of the vapor plug 106. The locking device 704 may be one or more magnets that interlock with one or more other magnets within a top inner portion of the payload area 506 of the dewar 104. The magnets may have opposing polarities so that when vapor plug 106 is turned in certain position within dewar 104 the magnets lock vapor plug within the dewar 104. Conversely, when vapor plug 106 is rotated about its axis to another position, the opposing polarity of the magnets may force vapor plug out of dewar 104.

The locking device 704 locks when the vapor plug 106 is inserted within the payload area 506. Since there may be a gap between the vapor plug 106 and the inner portion of the payload area 506 of the dewar 104, the locking device 704 locks the vapor plug 106 in place with the dewar 104 to prevent the vapor plug 106 from falling out when the dewar 104 is oriented or rotated in different directions. The gap between the vapor plug 106 and the dewar 104 allows gas to escape due to the expansion of the gas or evaporation of the liquid within the payload area 506 to prevent pressure from building up within the payload area 506.

The storage system 100 may include an electronic thermocouple 702, which may positioned, embedded or included within, or connected to the neck 410 of the vapor plug 106. The electronic thermocouple 702 may be an electronic device or sensor that measures and monitors the temperature within the dewar 104. The electronic thermocouple 702 may wireless transmit and/or communicate with another electronic device, such as a smart data logger, using a wireless protocol. The electronic thermocouple 702 may communicate and provide the temperature to the smart data logger and/or may receive instructions from the smart data logger to monitor the temperature. The smart data logger may display or otherwise communicate the temperature to a user or another electronic platform. This allows for real-time monitoring of the temperature within the dewar 104 by other individuals.

The storage system 100 may include an electronic orientation sensor 706, which may positioned, embedded or included within, or connected to the neck 410 of the vapor plug 106. The electronic orientation sensor 706 may be an electronic device or sensor that measures an orientation within the dewar 104, such as a gyroscope, or the like. The electronic orientation sensor 706 may wireless transmit and/or communicate with another electronic device, such as a smart data logger, using a wireless protocol. The electronic orientation sensor 706 may communicate and provide orientation data and/or angular velocity data to the smart data logger and/or may receive instructions from the smart data logger to monitor the orientation. The smart data logger may display or otherwise communicate the orientation to a user or another electronic platform. This allows for real-time monitoring of the orientation of dewar 104 by other individuals.

Figure 8A:
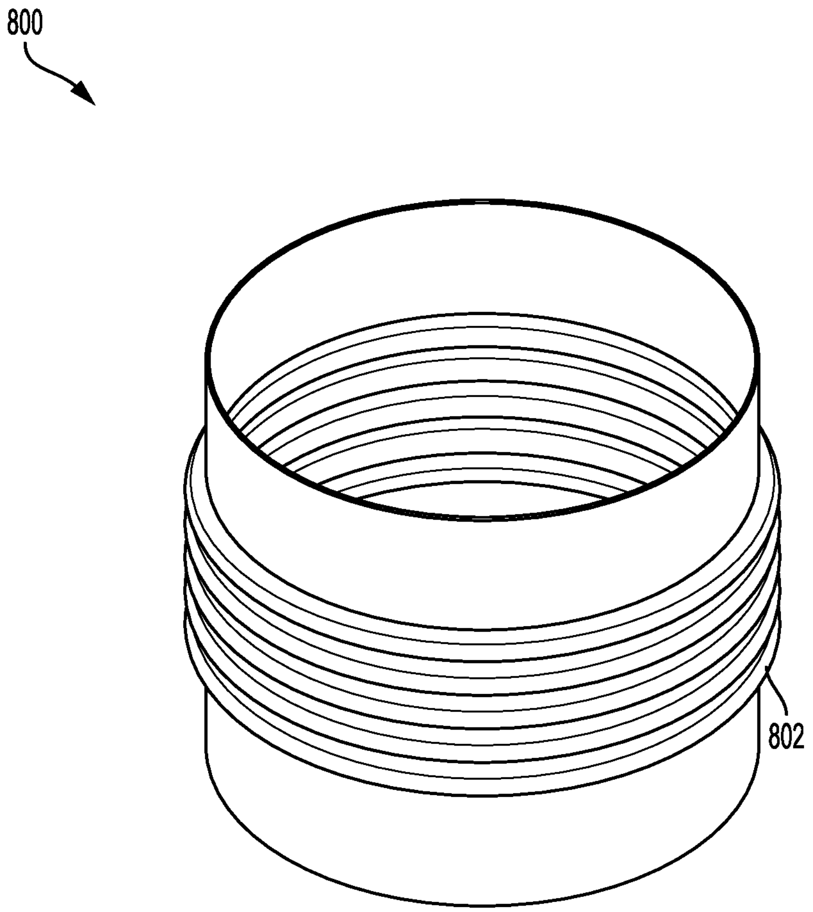
FIG. 8A is an example corrugated neck tube of the cryogenic storage system of FIG. 1 according to an aspect of the invention.
Figure 8B:
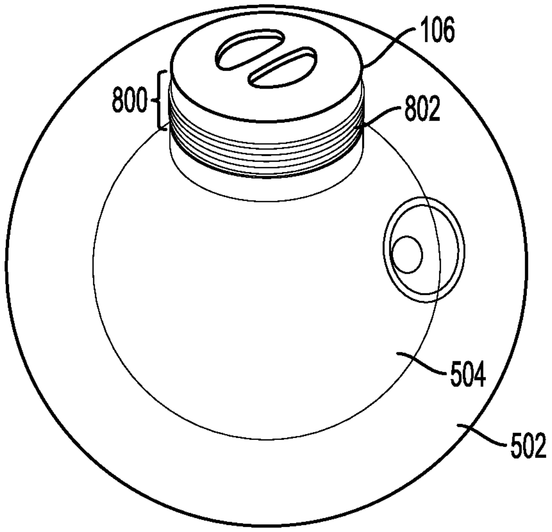
FIG. 8B shows the corrugated neck tube connected to the dewar of the cryogenic storage system of FIG. 1 according to an aspect of the invention.

The storage system 100 may include a corrugated neck tube 800, as shown in FIGS. 8A-8B for example. The corrugated neck tube 800 may be thin-walled. The corrugated neck tube 800 connects the inner wall 504 with the outer wall 502 of the dewar 104. The corrugated neck tube 800 reduces the overall height of the neck tube but keeps the overall length of the path, which conducts the heat, the same as a straight neck tube. The corrugated neck tube 800 may have a serpentine path 802 that provides the heat conduction. By reducing the height of the neck tube but keeping the overall path length the same as a straight neck tube, the corrugated neck tube 800 reduces the overall size of the dewar 104. Moreover, by keeping the overall path length for heat conduction the same as a straight neck tube, the corrugated neck tube 800 reduces the amount of heat that is conducted into the dewar 104. Thus, the corrugated neck tube 800 provides for the same heat conduction with a shorter neck tube (e.g., shorter overall height or size) than a straight neck tube of similar overall path length. For example, the height of the corrugated neck tube 800 may be 2-3 inches long, whereas, the overall path length for heat conduction may be 6 inches long because the overall path length for heat conduction may be a serpentine path along the thin-walled corrugated neck tube.

The storage system 100 includes a ball transfer device 900, as shown in FIG. 9 for example. The ball transfer device 900 may be connected to the enclosure 102 at the inner phalange or wing 202. The ball transfer device 900 may provide an interface between the enclosure 102 and the dewar 104 and allow the dewar 104 to freely rotate within the cavity of the enclosure 102.

The ball transfer device 900 may have a head 902 and a body 904. The head 902 and the body 904 may be shaped as cylinders. The diameter of the head 902 may be greater than the diameter of the body 904. The ball transfer device 900 may be inserted into a hole or opening of the inner phalange or wing 202. For example, the body 904 may be inserted into the opening and the head 902 may form a seal around the opening of the inner phalange or wing 202. The head 902 and body 904 may have an opening and a cavity where a ball bearing 906 and spring 908 reside.

The ball transfer device 900 may have a ball bearing 906, a cup 910 and a spring 908 that sits or rests in a cavity of the ball transfer device 900. The ball bearing 906 may have a top portion and a bottom portion. The top portion of the ball bearing 906 may protrude from the head 902 of the ball transfer device 900. The top portion of the ball bearing 906 that protrudes contacts the dewar 104 when the dewar 104 sits in the cavity of the enclosure 102. The ball bearing 906 minimizes the friction between the enclosure 102 and the dewar 104 allowing the dewar 104 to freely rotate or move within the enclosure 102. The ball bearing 906 provides for a frictionless or a reduced friction surface. The bottom portion of the ball bearing 906 that is within the cavity of the body 904 may rest on the cup 910, which engages with the spring 908.

The cup 910 interfaces between a bottom portion of the ball bearing 906 and the spring 908, such that when a force is applied on the top portion of the ball bearing 906, the bottom portion of the ball bearing 906 presses against the cup 910, which provides a downward force on the spring 908 so that the spring 908 contracts. This allows the dewar 104 to freely rotate within the enclosure 102 and allows the enclosure 102 to absorb shocks and vibrations during storage and/or transport. When the dewar 104 presses against the ball bearing 906, the ball bearing 906 further enters into the cavity of the body 904 while the spring 908 further contracts. This allows the dewar 104 to jostle instead of remain rigid so that any shocks or vibrations are absorbed. When the event causing the shocks or vibrations has passed, the spring 908 returns or expands back into a normal state and keeps the dewar 104 positioned within the cavity of the enclosure 102. Moreover, the one or more ball bearings 906 allow the dewar 104 to rotate or angle so that the dewar 104 remains passively stabilized and upright regardless of the orientation of the enclosure 102.

The spring 908 may contract when a downward force is applied to the ball bearing 906, such as when the dewar 104 exerts an outward force on the ball bearing 906 due to shocks or vibrations on the enclosure 102. For example, when the enclosure 102 is moved, shifted or dropped a vibrational force is exerted on the enclosure 102. If the dewar 104 moves or shifts in response to the vibrational force, the dewar 104 may exert an outward force on the ball transfer device 900, and instead of violently contacting the enclosure 102, the dewar 104 exerts a force on the ball bearing 906, which retracts within the cavity of the body 904 and causes the spring 908 to contract and absorb the force.

Figure 10:
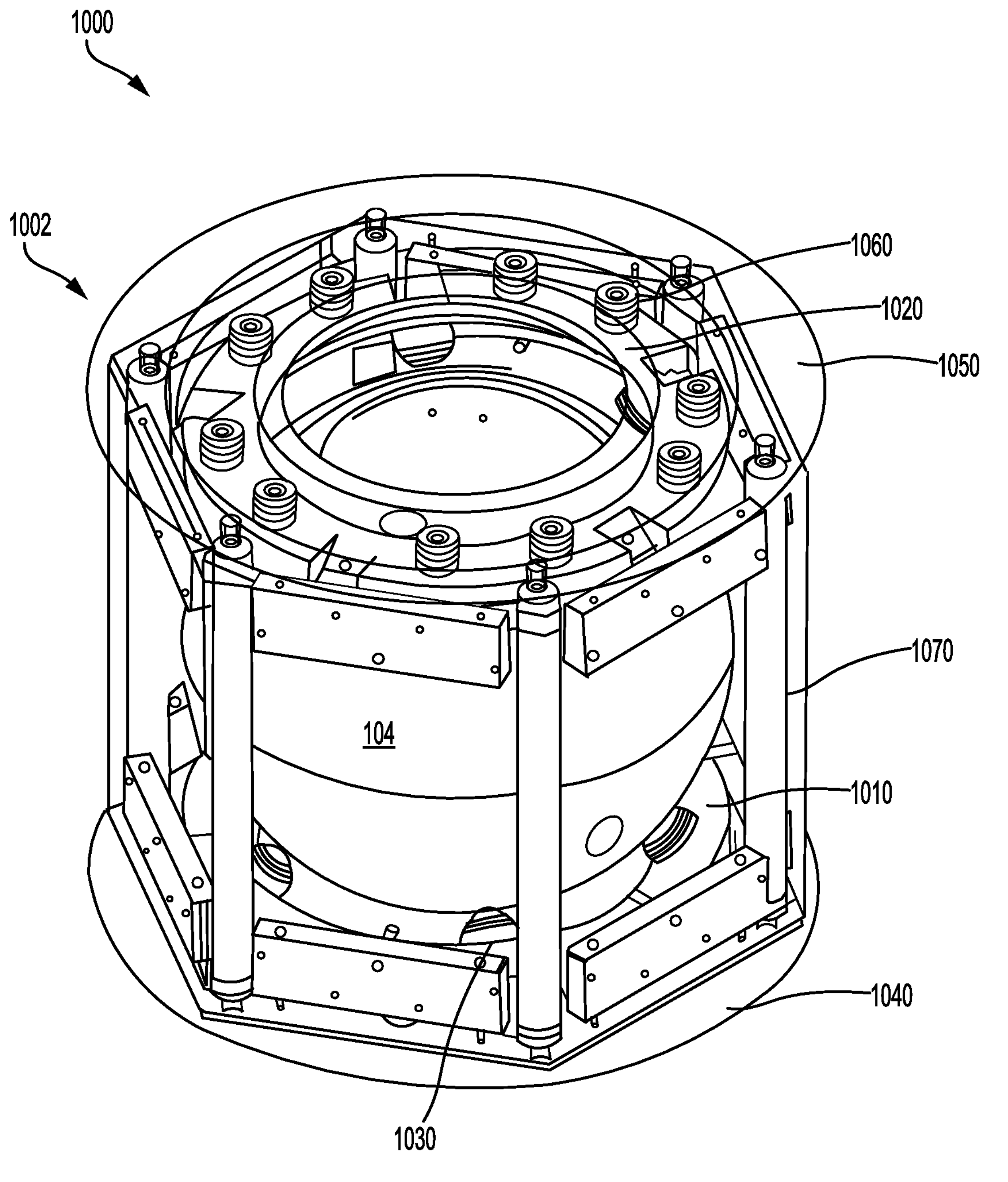
FIG. 10 is an enclosure assembly of the cryogenic storage system of FIG. 1 according to an aspect of the invention.

Referring now to FIG. 10, a storage system 1000, in accordance with various embodiments, is illustrated. Storage system 1000 comprises a dewar 104 and an enclosure assembly 1002. The enclosure assembly 1002 comprises a first support ring 1010 and a second support ring 1020. The first support ring 1010 may be disposed opposite the second support ring 1020. The first support ring 1010 and the second support ring 1020 may comprise the same geometry (e.g., a raceway or the like. Each support ring 1010, 1020 includes a plurality of ball transfer devices 1030. Each ball transfer device in the plurality of ball transfer devices 1030 may be in accordance with the ball transfer device 900 from FIG. 9. In various embodiments, the ball transfer devices 1030 may comprise a ball bearing, or the like.

The enclosure assembly 1002 may further comprise a first end plate 1040 and a second end plate 1050. The first end plate 1040 is disposed opposite the second end plate 1050. The first support ring 1010 is coupled to the first end plate 1040 and the second support ring 1020 is coupled to the second end plate 1050 by any method known in the art, such as a fastener, an adhesive, or the like. Each end plate 1040, 1050 may be flat. Each support ring 1010, 1020 may comprise a sloped surface at an angle relative to an adjacent surface of each end plate 1040, 1050. For example, an inner surface of first support ring 1010 may be disposed at an acute angle relative to a surface of the first support ring that is distal to the dewar 104. The plurality of ball transfer devices 1030 may be disposed about the sloped surface. In various embodiments, the ball transfer devices 1030 may contact the dewar at a point substantially tangential to an outer surface of the dewar 104. "Substantially tangential," as referred to herein, is tangential +/−15 degrees.

The enclosure assembly 1002 may further comprise a plurality of springs 1060. A first plurality of springs in the plurality of springs 1060 may be disposed between the first end plate 1040 and the first support ring 1010 and a second plurality of springs in the plurality of springs 1060 may be disposed between the second end plate 1050 and the second support ring 1020. The plurality of springs 1060 may be configured for shock absorption during transfer of the storage system 1000.

The enclosure assembly 1002 may further comprise a plurality of rods 1070 disposed between the first end plate 1040 and the second end plate 1050. Each rod in the plurality of rods 1070 may be coupled to the first end plate 1040 and the second end plate 1050 by any method known in the art, such as fasteners, adhesives, or the like. The plurality of rods 1070 may be configured to secure the dewar 104 between the first support ring 1010 and the second support ring 1020 by ensuring the dewar 104 is in contact with each ball transfer device in the plurality of ball transfer devices 1030.

The enclosure assembly 1002 may be configured to protect the dewar 104 from external forces during transfer of the storage system 1000. For example, the ball transfer devices 1030 may provide near frictionless contact with the dewar, so it can rotate freely within the enclosure assembly 1002. The plurality of springs 1060 may provide shock absorption when external forces are applied to the enclosure assembly.

Figure 11:
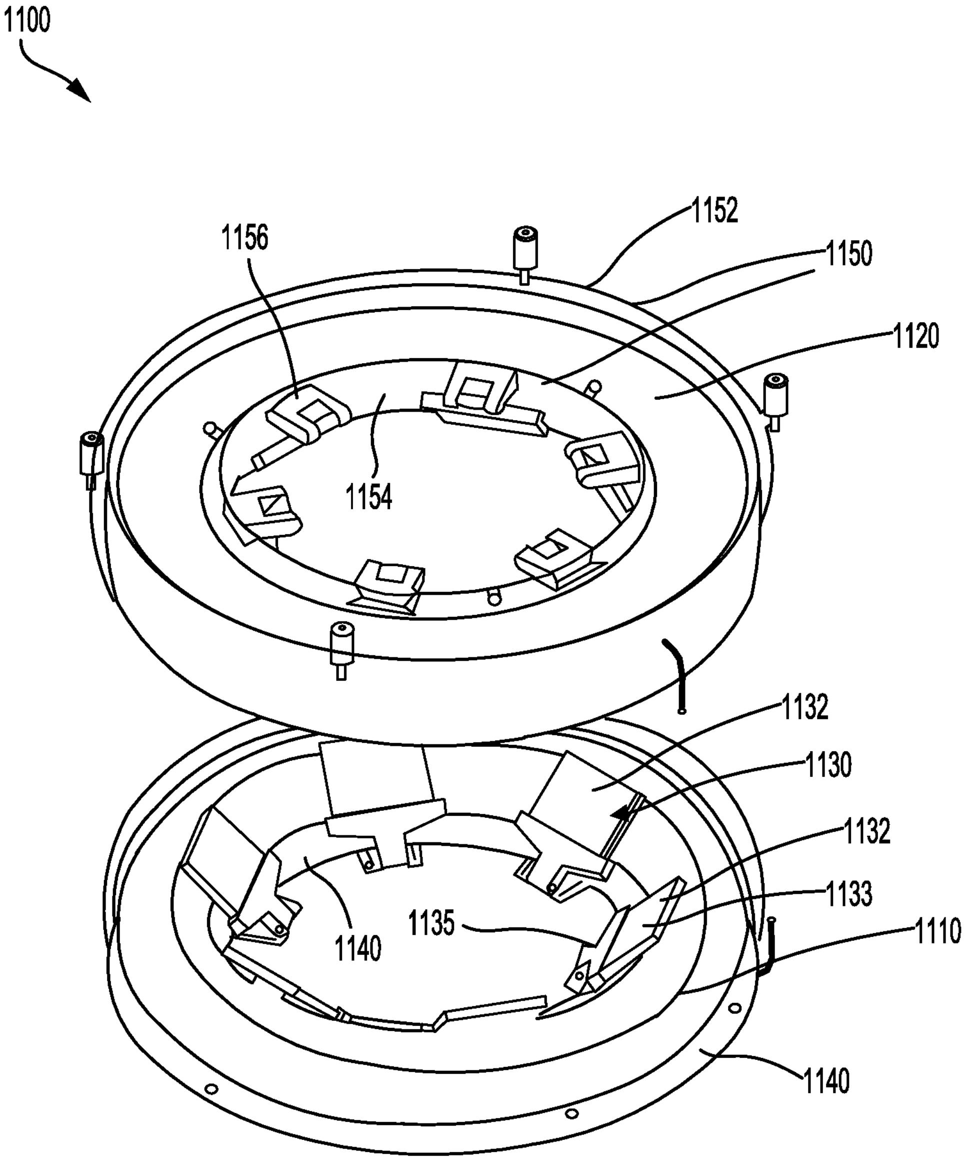
FIG. 11 is an enclosure assembly of the cryogenic storage system of FIG. 1 according to an aspect of the invention.

Referring now to FIG. 11, an enclosure assembly 1102 is illustrated, in accordance with various embodiments. The enclosure assembly 1102 comprises a first support tube 1110 and a second support tube 1120. The first support tube 1110 may be disposed opposite the second support tube 1120. In various embodiments, the first support tube 1110 and the second support tube 1120 may comprise may be made of polyester, nylon, vinyl, or the like. The first support tube 1110 and the second support tube 1120 may be filled with a gas or a liquid. The gas or the liquid may be configured to maintain the same volume as temperature changes (i.e., the gas or liquid may not contract or expand as temperature changes). In various embodiments, the first support tube 1110 and the second support tube 1120 may be filled with nitrogen gas.

The enclosure assembly 1102 further comprises a plurality of pad assemblies 1130. Each pad in the plurality of pad assemblies 1130 may comprise a padding component and a pad housing. For example, pad assembly 1132 of the plurality of pad assemblies 1130 comprises a padding component 1133 and a pad housing 1135. The padding component 1133 may comprise a plate, or the like. The padding component 1133 may be made of a flexible material, such as polytetrafluoroethylene (PTFE), a thermoplastic polymer, or the like. The pad housing 1135 may comprise a receptacle configured to receive the padding component 1133. The padding component 1133 may be configured to removably couple to the pad housing 1135 by any method known in the art, such as press fit, fastening, adhesion, or the like.

The enclosure assembly 1102 further comprises a first enclosure 1140 and a second enclosure 1150. The first enclosure 1140 may be disposed opposite the second enclosure 1150. The first enclosure 1140 and the second enclosure 1150 may be configured to receive a respective support tube. For example, first support tube 1110 is coupled to first enclosure 1140 by any method known in the art, such as press fitting, fasteners, adhesion, or the like. The first support tube 1110 is housed in first enclosure 1140. The first enclosure 1140 may fix the first support tube in place. In various embodiments, each enclosure may comprise a radially outer ring, a radially inner ring, and a plurality of flanges. For example, the second enclosure 1150 comprises a radially outer ring 1152, a radially inner ring 1154, and a plurality of flanges 1156. Each flange in the plurality of flanges 1156 may extend radially inward from radially inner ring 1154. The plurality of flanges 1156 may be disposed substantially equal-distant around radially inner ring 1154. Each flange in the plurality of flanges 1156 may be configured to hingedly couple to a respective pad assembly in the plurality of pad assemblies 1130.

The plurality of pad assemblies 1130 may be configured to receive the a dewar 104 (as shown in FIG. 10). The dewar 104 may be configured to only contact the pads of the respective pad assemblies. Each pad in the plurality of pad assemblies 1130 may act as a near frictionless surface for the dewar to rotate about. The first support tube 1110 and the second support tube 1120 may be configured to absorb shock from external forces during transfer of a storage system comprising the enclosure assembly 1102 and a dewar 104. The first enclosure 1140 and the second enclosure 1150 may be configured to couple to an enclosure, such as enclosure 102 (from FIG. 1), or the like. In various embodiments, the enclosure assembly 1102 may be lighter than enclosure assembly 1002. In various embodiments, the enclosure assembly 1102 may provide greater shock absorption than enclosure assembly 1002.

Figure 12:
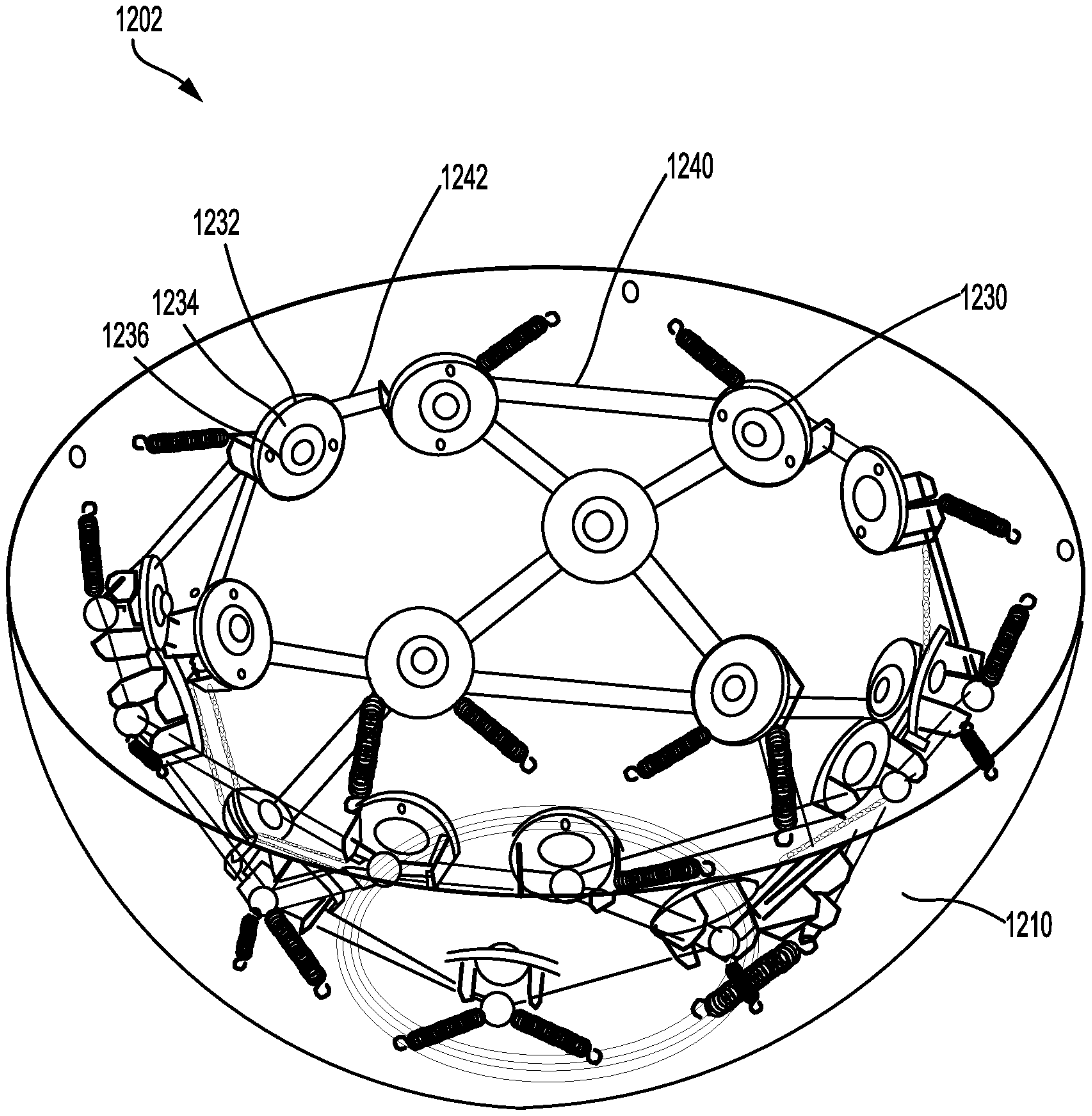
FIG. 12 is an enclosure assembly of the cryogenic storage system of FIG. 1 according to an aspect of the invention.

Referring now to FIG. 12, a portion of an enclosure assembly 1202, in accordance with various embodiments, is illustrated. The enclosure assembly 1202 comprises a first enclosure 1210. The first enclosure 1210 may be shaped like a spherical cap, or the like. The enclosure assembly further comprises a plurality of transfer rollers 1230 disposed around an inner surface of the first enclosure 1210. The plurality of transfer rollers 1230 are suspended by a net assembly 1240 in first enclosure 1210.

In various embodiments, the net assembly 1240 comprises a plurality of cables 1242. The plurality of cables 1242 are coupled to the plurality of transfer rollers 1230 and configured to suspend the plurality of transfer rollers such that the plurality of transfer rollers 1230 do not make contact with the first enclosure during transfer of a corresponding storage system. The plurality of cables 1242 may be elastic cables, steel cables, or the like. The enclosure assembly 1202 further comprises a plurality of springs 1250. Each spring in the plurality of springs 1250 is coupled to a respective transfer roller in the plurality of transfer rollers 1230. In various embodiments, more than one spring in the plurality of springs 1250 may be coupled to a respective transfer roller in the plurality of transfer rollers 1230. In various embodiments, a transfer roller in the plurality of transfer rollers 1230 may be coupled to no springs and/or suspended entirely by the plurality of cables 1242 in the net assembly.

In various embodiments, the enclosure assembly 1202 may further comprise a second enclosure. The second enclosure may be in accordance with first enclosure 1210. The second enclosure may be disposed opposite first enclosure 1210. The enclosure assembly 1202 may be configured to receive a dewar 104 (as shown in FIG. 1). The enclosure assembly 1202 may be configured to suspend the dewar away from the first enclosure 1210 and the second enclosure during transfer of a respective storage system.

In various embodiments, each transfer roller in the plurality of transfer rollers 1230 comprises a housing and a ball bearing. For example, transfer roller 1232 comprises a housing 1234 and a bearing 1236. The bearing 1236 is disposed in housing 1234. The bearing 1236 protrudes outward from housing 1234. The bearing 1236 may provide a near frictionless outer surface. The bearing 1236 may be configured to allow a dewar (e.g., dewar 104 from FIG. 1) to rotate freely within the enclosure assembly 1202 during transfer of a respective storage system.

Figure 13:
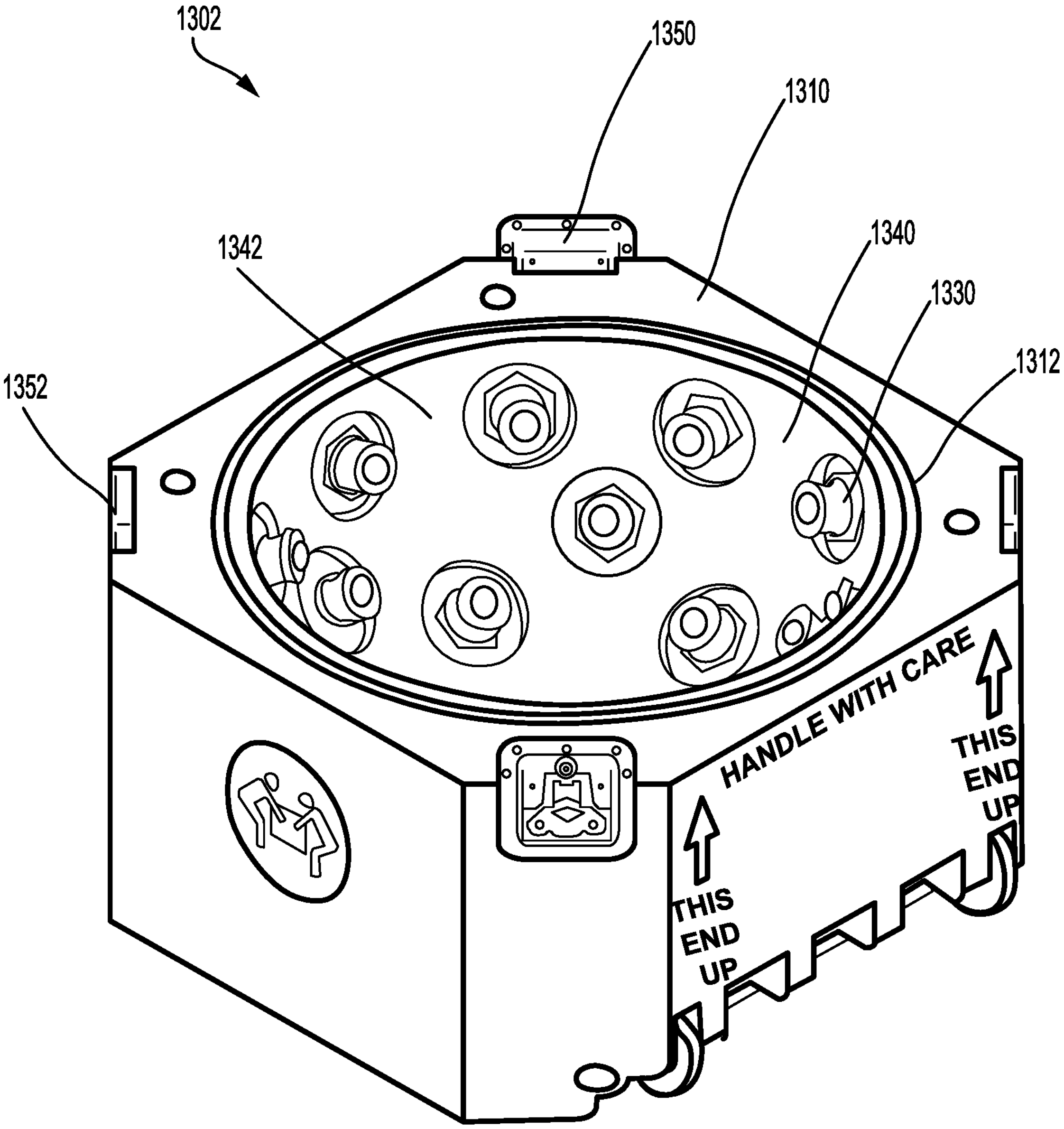
FIG. 13 is an enclosure assembly of the cryogenic storage system of FIG. 1 according to an aspect of the invention.

Referring now to FIG. 13, a portion of an enclosure assembly 1302, in accordance with various embodiments, is illustrated. The enclosure assembly 1302 comprises an enclosure 1310. The enclosure 1310 may comprise a box shape or the like. The enclosure 1310 may define a recess 1312, such as a substantially hemispherical recess, a sphere and cap recess, or the like. The enclosure assembly 1302 further comprises a padding component 1340 disposed within the recess 1312. The padding component 1340 may comprise a flexible material, such as foam, rubber, or the like. The enclosure assembly 1302 further comprises a plurality of ball transfer devices 1330 disposed around an inner surface of the padding component 1340. Each ball transfer device in the plurality of ball transfer devices 1330 may comprise ball transfer device 900 (from FIG. 9).

In various embodiments, the enclosure assembly 1302 is configured for dual shock absorption during transfer of a dewar. For example, when an external force is applied to the enclosure assembly 1302, the plurality of ball transfer devices 1330 may absorb a portion of the shock via a spring of each ball transfer device in the plurality of ball transfer devices 1330. Similarly, upon compression of the spring, the dewar may contact the padding component 1340, which may absorb a portion of the shock from the external force.

In various embodiments, each ball transfer device in the plurality of ball transfer devices 1330 may be disposed within padding component 1340 and coupled to padding component 1340 and/or coupled to enclosure 1310. Each ball transfer device in the plurality of ball transfer devices 1330 may protrude outward from an inner surface 1342 of padding component 1340. Under normal transfer conditions, a dewar (e.g., dewar 104) may only contact the plurality of ball transfer devices 1330. Upon experiencing an external force, a dewar (e.g., dewar 104), may contact the padding component 1340 and/or a portion of the plurality of ball transfer devices 1330.

In various embodiments, the enclosure assembly 1302 may further comprise a fastener 1350 coupled to a side of the enclosure 1310. The fastener 1350 may be any fastener known in the art, such as a latch, or the like. The fastener 1350 may be configured to engage a mating fastener of an adjacent enclosure. In various embodiments, the adjacent enclosure is in accordance with enclosure 1310. The enclosure assembly 1302 may comprise a first enclosure (e.g., enclosure 1310) and a second enclosure (e.g., enclosure 1310). The first enclosure and the second enclosure may be configured to fully encapsulate a dewar (e.g., dewar 104 from FIG. 1) as a part of a storage system, in accordance with various embodiments.

In various embodiments, the enclosure assembly 1302 may further comprise a fastener receptacle 1352. The fastener receptacle 1352 may be configured to fasten to a respective fastener (e.g., fastener 1350) of a mating enclosure (e.g., enclosure 1310). The fastener 1350 and fastener receptacle 1352 may ensure the enclosure assembly 1302 fully encloses a respective dewar (e.g., dewar 104).

Figure 14:
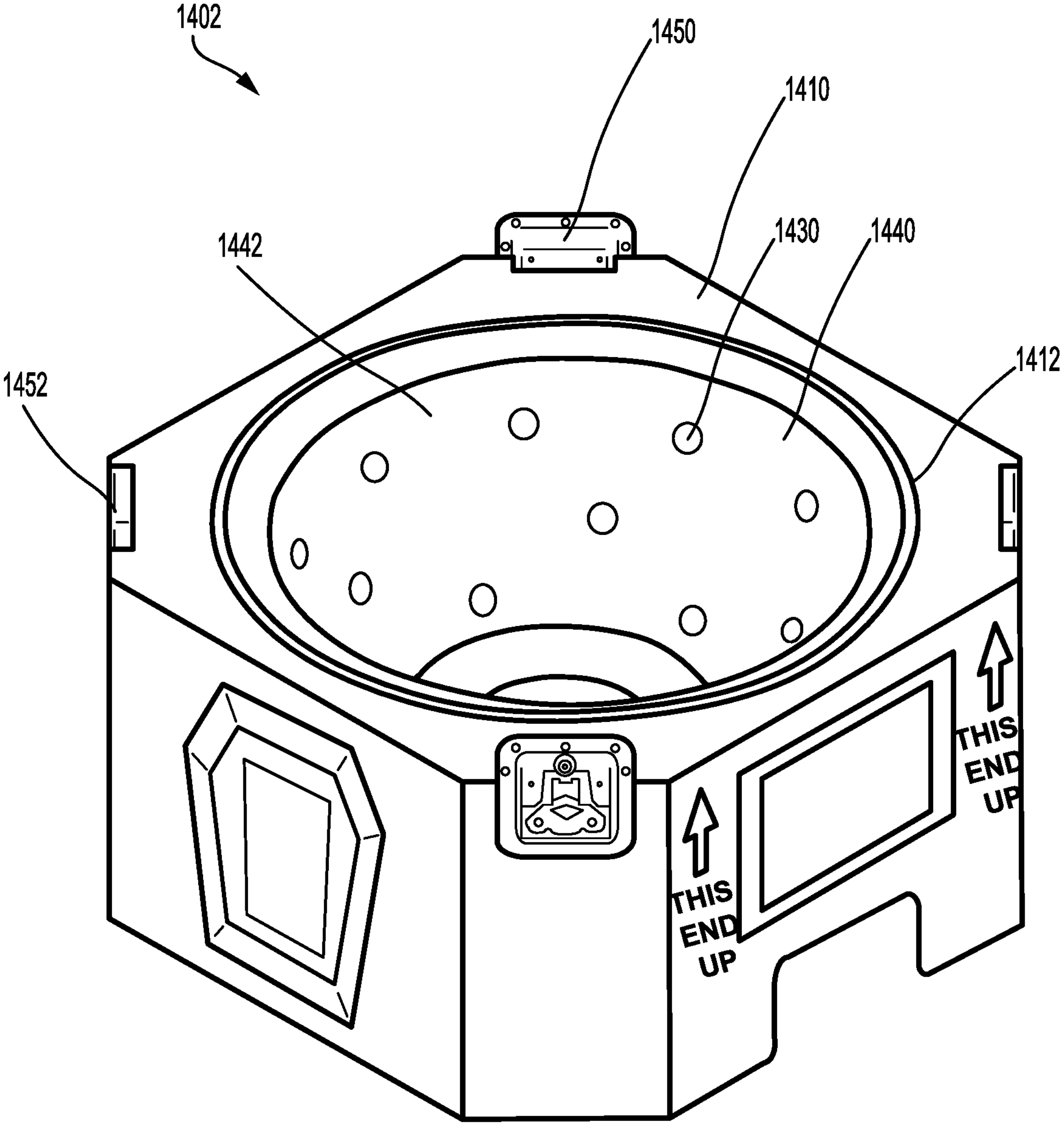
FIG. 14 is an enclosure assembly of the cryogenic storage system of FIG. 1 according to an aspect of the invention.

Referring now to FIG. 14, a portion of an enclosure assembly 1402, in accordance with various embodiments, is illustrated. The enclosure assembly 1402 comprises an enclosure 1410. The enclosure 1410 may comprise a box shape or the like. The enclosure 1410 may define a recess 1412, such as a substantially hemispherical recess, a sphere and cap recess, or the like. The enclosure assembly 1402 further comprises a padding component 1440 disposed within the recess 1412. The padding component 1440 may comprise a flexible material, such as foam, rubber, or the like. The enclosure assembly 1402 further comprises a plurality of ball elements 1430 disposed around an inner surface of the padding component 1440. Each ball element in the plurality of ball elements 1430 may be embedded in the padding component 1440. Each ball element in the plurality of ball elements 1430 may be configured to rotate freely within the padding component 1440.

Each ball element in the plurality of ball elements 1430 may protrude outward from an inner surface 1442 of padding component 1340. Under normal transfer conditions, a dewar (e.g., dewar 104) may only contact the plurality of ball elements 1430. Upon experiencing an external force, a dewar (e.g., dewar 104), may contact the padding component 1440 and/or a portion of the plurality of ball elements 1430 (i.e., each ball element in the plurality of ball elements 1430 may be configured to deform the padding component 1440).

In various embodiments, the enclosure assembly 1402 may further comprise a fastener 1450 coupled to a side of the enclosure 1410. The fastener 1450 may be any fastener known in the art, such as a latch, or the like. The fastener 1450 may be configured to engage a mating fastener of an adjacent enclosure. In various embodiments, the adjacent enclosure is in accordance with enclosure 1410. The enclosure assembly 1402 may comprise a first enclosure (e.g., enclosure 1410) and a second enclosure (e.g., enclosure 1410). The first enclosure and the second enclosure may be configured to fully encapsulate a dewar (e.g., dewar 104 from FIG. 1) as a part of a storage system, in accordance with various embodiments.

In various embodiments, the enclosure assembly 1402 may further comprise a fastener receptacle 1452. The fastener receptacle 1452 may be configured to fasten to a respective fastener (e.g., fastener 1450) of a mating enclosure (e.g., enclosure 1410). The fastener 1450 and fastener receptacle 1452 may ensure the enclosure assembly 1302 fully encloses a respective dewar (e.g., dewar 104).

Figure 15:
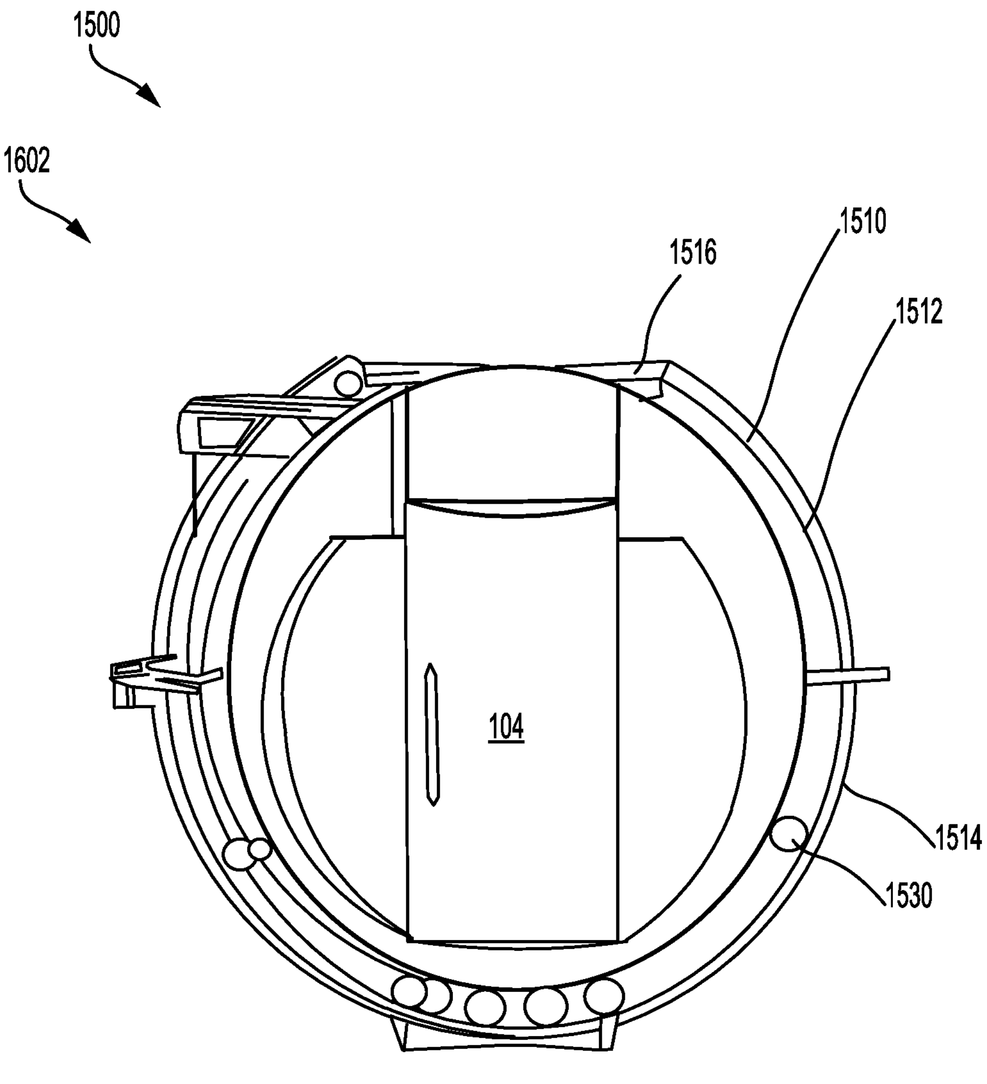
FIG. 15 is an enclosure assembly of the cryogenic storage system of FIG. 1 according to an aspect of the invention.

Referring now to FIG. 15, a portion of a storage system 1500 and a portion of an enclosure assembly 1602, in accordance with various embodiments, is illustrated. Storage system 1500 comprises a dewar 104 disposed within an outer dome 1510. The storage system 1500 may further comprise a plurality of ball elements 1530 disposed between the outer dome 1510 and the dewar 104. In various embodiments, outer dome 1510 comprises a first dome portion 1512 and a second dome portion 1514. First dome portion 1512 may be coupled to second dome portion 1514 by any method known in the art, such as a fastener, a hinge, or the like. First dome portion 1512 may further comprise an aperture 1516 disposed through an outer surface of first dome portion 1512. First dome portion 1512 and second dome portion 1514 may comprise a substantially hemispherical shape, or the like. Dewar 104 may be configured to rotate freely within outer dome 1510 during transfer of storage system 1500. The outer dome 1510 may be made of any material known in the art, such as metal, plastic, or the like. The outer dome 1510 may define a substantially spherical cavity configured to receive dewar 104 therein.

In various embodiments, the plurality of ball elements 1530 may be configured to contact at least a third of a surface area of an outer surface of dewar 104. For example, second dome portion 1514 of outer dome 1510 may be filled with the plurality of ball elements 1530 and ensure that at least a third of the surface area of the outer surface of dewar 104 is in contact with plurality of ball elements. In various embodiments, the storage system 1500 may be configured to ensure the outer surface of dewar 104 is only in contact with the plurality of ball elements 1530 during transfer of the storage system 1500. Each ball element in the plurality of ball elements 1530 may be made of any material known in the art, such as plastic, metal, or the like. In various embodiments, each ball element in the plurality of ball elements 1530 is made of plastic.

Each ball element in the plurality of ball elements 1530 may provide a near frictionless outer surface. Each bearing in the plurality of ball elements 1530 may be configured to allow dewar 104 to rotate freely within the outer dome 1510 of enclosure assembly 1602 during transfer of a respective storage system.

Figure 16:
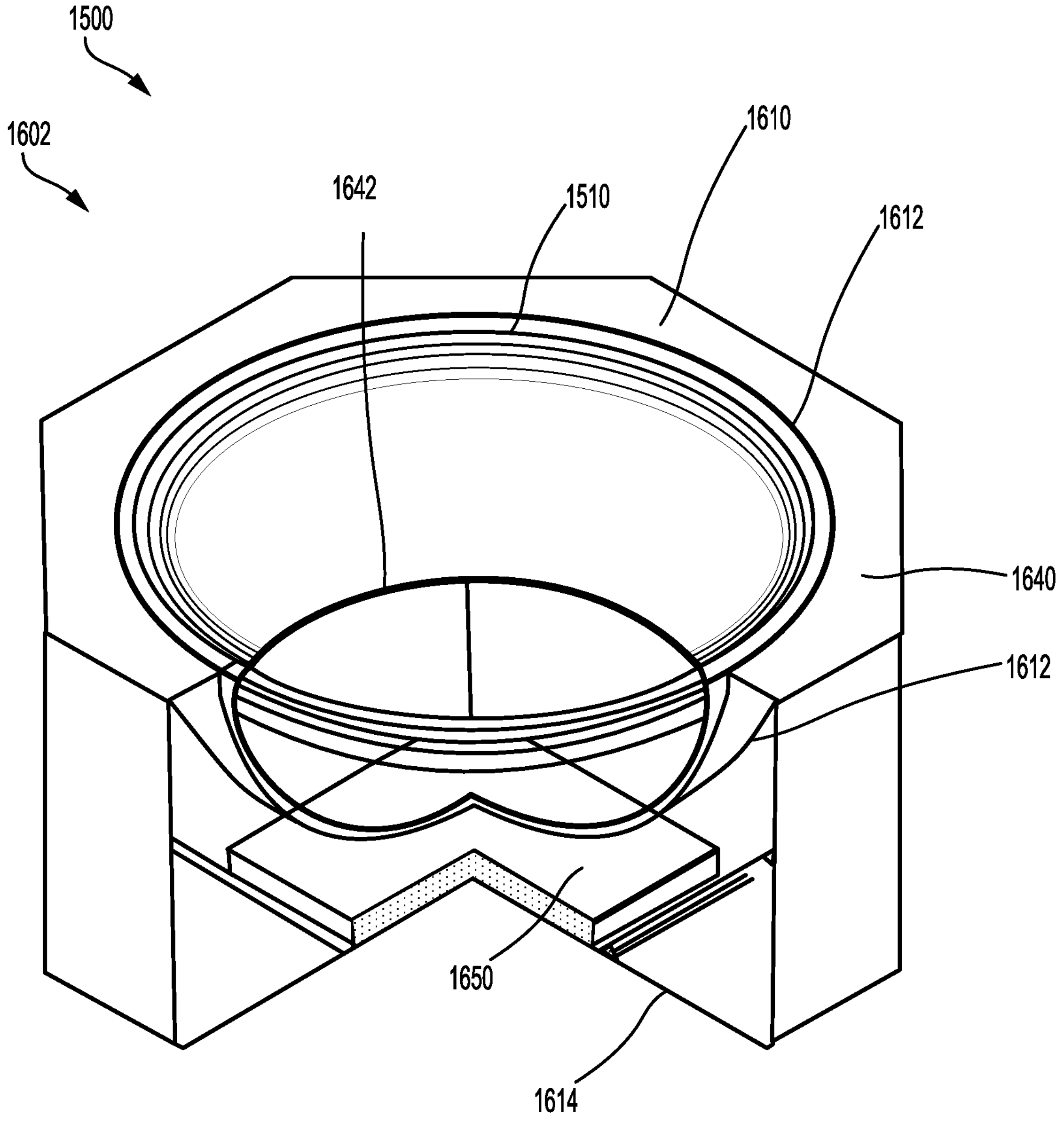
FIG. 16 is an enclosure assembly of the cryogenic storage system of FIG. 1 according to an aspect of the invention.

Referring now to FIG. 16, a portion of a storage system 1500, in accordance with various embodiments, is illustrated. Storage system 1500 may further comprise an enclosure assembly 1602. Enclosure assembly 1602 may comprise an enclosure 1610. Enclosure 1610 may comprise any shape known in the art, such as a box, a hexagon, or the like. The enclosure 1410 may comprise a box shape or the like. The enclosure 1610 may define a recess 1612, such as a substantially hemispherical recess, a sphere and cap recess, or the like. The enclosure assembly 1602 further comprises a padding component 1640 disposed within the recess 1612. The padding component 1640 may comprise a flexible material, such as foam, rubber, or the like. The padding component 1640 may comprise a gasket, or the like. The enclosure assembly 1602 may further comprise a portion of outer dome 1510 (e.g., first dome portion 1512 or second dome portion 1514. The portion of outer dome 1510 may be disposed in the recess 1612 and/or may contact the padding component 1640. After a portion of outer dome 1510 is disposed in recess 1612, the plurality of ball elements 1530 (from FIG. 15) may be disposed in the portion of outer dome 1510.

In various embodiments, padding component 1640 may comprise an aperture 1642 disposed proximate a distal surface 1614 of enclosure 1610. "Distal surface," as described herein, is a surface that is distal from a center of a storage system 1500, in accordance with various embodiments. As such, the padding component 1640 may be configured to receive a portion of outer dome 1510 and/or secure outer dome 1510 in place via press fit, or the like. Padding component 1640 may be coupled to enclosure 1610 by any method known in the art, such as adhesive, or the like.

In various embodiments, enclosure assembly 1602 may further comprise a second padding component 1650 disposed proximate distal surface 1614 of enclosure 1610. The second padding component 1650 may be configured to provide additional shock support if the outer dome 1510 bottoms out during transfer of storage system 1500.

In various embodiments, enclosure assembly 1602 may comprise a first enclosure (e.g., enclosure 1610) and a second enclosure (e.g., enclosure 1610). The first enclosure and the second enclosure may be configured to be coupled together by any method known in the art, such as fasteners and fastener receptacles, as described in enclosure assembly 1302 from FIG. 13, or the like.

Figure 17:
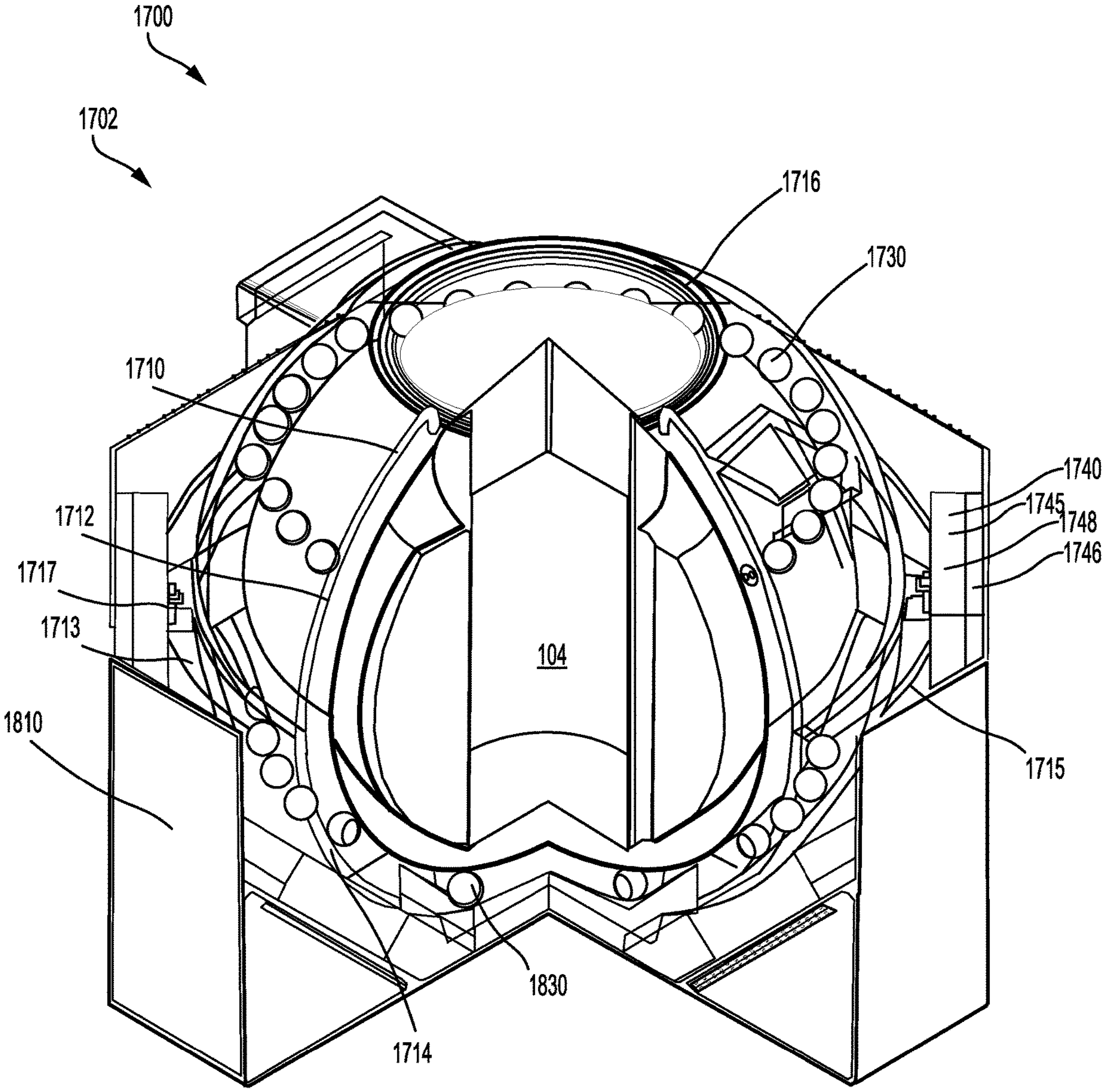
FIG. 17 is an enclosure assembly of the cryogenic storage system of FIG. 1 according to an aspect of the invention.

Referring now to FIG. 17, a portion of a storage system 1700, in accordance with various embodiments, is illustrated. For ease of illustration, the outer dome 1710 is illustrated as being transparent. The storage system 1700 comprises an enclosure assembly 1702 and a dewar 104. The enclosure assembly 1702 comprises an enclosure 1810, an outer dome 1710, and a plurality of ball elements 1730.

In various embodiments, outer dome 1710 comprises a first dome portion 1712 and a second dome portion 1714. First dome portion 1712 may be coupled to second dome portion 1714 by any method known in the art, such as a fastener, a hinge, or the like. For example, first dome portion 1712 may comprise a first flange 1713 and second dome portion 1714 may comprise a second flange 1715. First flange 1713 and second flange 1715 may be disposed adjacent to each other. First flange 1713 may be coupled to second flange 1715 by any method known in the art, such as by a fastener (e.g., fastener 1717). First dome portion 1712 and second dome portion 1714 may each comprise a substantially hemispherical shape, or the like. First dome portion 1712 may further comprise an aperture 1516 disposed through an outer surface of first dome portion 1512. Dewar 104 may be configured to rotate freely within outer dome 1510 during transfer of storage system 1700. The outer dome 1710 may be made of any material known in the art, such as metal, plastic, or the like.

In various embodiments, the plurality of ball elements 1730 may be configured to contact at least a third of a surface area of an outer surface of dewar 104. For example, second dome portion 1714 of outer dome 1710 may be filled with the plurality of ball elements 1730 and ensure that at least a third of the surface area of the outer surface of dewar 104 is in contact with plurality of ball elements. In various embodiments, the storage system 1700 may be configured to ensure the outer surface of dewar 104 is only in contact with the plurality of ball elements 1530 during transfer of the storage system 1500. Each ball element in the plurality of ball elements 1730 may be made of any material known in the art, such as plastic, metal, or the like. In various embodiments, each ball element in the plurality of ball elements 1730 is made of plastic.

Each ball element in the plurality of ball elements 1730 may provide a near frictionless outer surface. Each bearing in the plurality of ball elements 1730 may be configured to allow dewar 104 to rotate freely within the outer dome 1710 of enclosure assembly 1702 during transfer of storage system 1700.

In various embodiments, the enclosure assembly 1702 further comprises a plurality of padding components 1740. The plurality of padding components 1740 may be disposed around outer dome 1710. In various embodiments, each padding component in the plurality of padding components 1740 may be oriented substantially perpendicular to outer surface of outer dome 1710. Each padding component in the plurality of padding components 1740 may comprise a first padding portion and a second padding portion. For example, padding component 1745 comprises a first padding portion 1746 and a second padding portion 1748. First padding portion 1746 may be coupled to an inner surface of enclosure 1810 by any method known in the art, such as adhesives, fasteners, or the like. The second padding portion 1748 may be coupled to the first padding portion 1746 by any method known in the art, such as adhesives, fasteners or the like. The second padding portion 1748 may be configured to contact an outer surface and/or a flange of an outer dome 1710 of an enclosure assembly 1702 during transfer of storage system 1700.

In various embodiments, the first padding portion 1746 may be stiffer than the second padding portion 1748. The first padding portion 1746 may be configured for vibration dampening during transfer of storage system 1700. The second padding portion 1748 may be configured for shock absorption from an external force during transfer of storage system 1700. In various embodiments, the first padding portion 1746 and the second padding portion 1748 are made of a flexible material, such as a foam, rubber or the like. In various embodiments, the first padding portion is made of a urethane polymer (e.g., synthetic viscoelastic urethane polymer). In various embodiments, the second padding portion 1748 is made of a polyethylene polymer.

Although described with respect to various embodiments, any feature from a given embodiment may be utilized in an alternative embodiment and still be within the scope of this disclosure.

Figure 18:
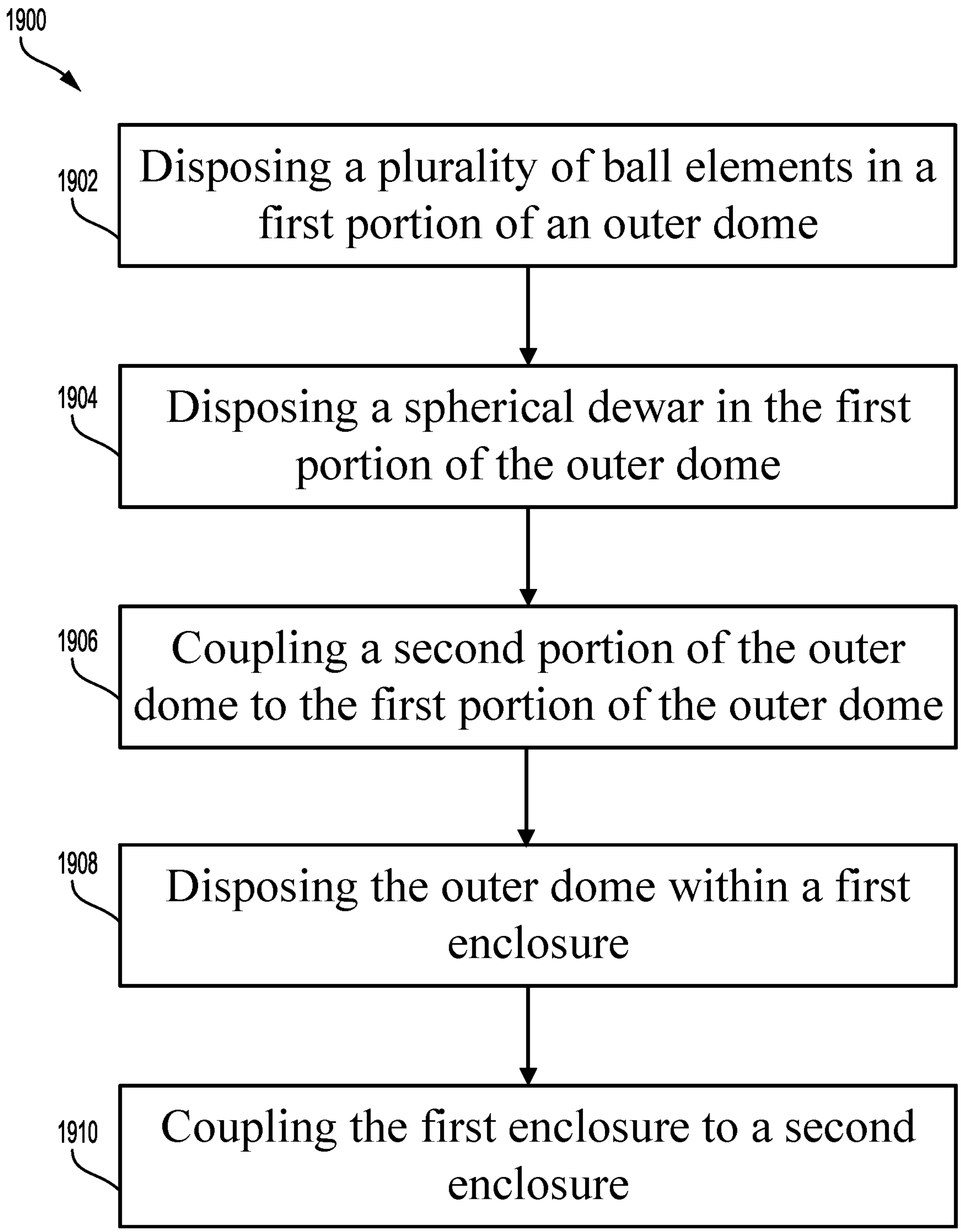
FIG. 18 is a method of assembling a cryogenic storage system according to an aspect of this invention.

Referring now to FIG. 18, a method 1900 of assembling a storage system, in accordance with various embodiments, is illustrated. The method comprises disposing a plurality of ball elements in a first portion of an outer dome (step 1902). The first portion of the outer dome may be substantially hemispherical in shape. The plurality of ball elements may fill at least two-thirds of a surface area of the first portion of the outer dome. The method further comprises disposing a spherical dewar within the first portion of the outer dome (step 1904). A radially outer surface of the spherical dewar may be in contact with the plurality of ball elements only. The method further comprises coupling a second portion of the outer dome to the first portion of the outer dome (step 1906). The second portion of the outer dome may be substantially hemispherical in shape. The second portion of the outer dome may comprise an aperture disposed distal to the first portion of the outer dome. The spherical dewar may be configured to rotate freely within the outer dome on the plurality of ball elements.

The method may further comprise disposing the outer dome into a first enclosure (step 1908). The first enclosure may be coupled to a padding component. In various embodiments, the first enclosure may be in accordance with enclosure 1610, enclosure 1810, or the like. The method may further comprise coupling a second enclosure to the first enclosure (step 1910). The second enclosure may be in accordance with enclosure 1610, enclosure 1810, or the like. The first enclosure and the second enclosure may fully encapsulate the outer dome. The outer dome and the plurality of ball bearing elements may be configured to allow the spherical dewar to experience little to no friction during transfer of the storage system. The first enclosure and the second enclosure may be configured to provide shock absorption and/or vibration dampening of the spherical dewar during transportation of the storage system.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A cryogenic storage system, comprising:

a storage container comprising a spherical radially outer surface defining at least a portion of a sphere, wherein all points on the spherical radially outer surface defining the at least the portion of the sphere are equidistant from a center of the storage container; and an enclosure assembly configured to house the storage container, the enclosure assembly comprising:

an outer dome comprising a spherical cavity and a spherical radially inner surface that is a spherical surface of the spherical cavity, wherein all points of the spherical radially outer surface are always radially inward of the spherical radially inner surface of the spherical cavity; and wherein the storage container has a center of gravity or mass within a bottom portion of the storage container that passively stabilizes the storage container when the storage container is tilted, angled or rotated within the enclosure assembly, wherein the spherical radially outer surface of the storage container is supported by the spherical radially inner surface of the spherical cavity inwardly of the spherical radially inner surface.

2. The cryogenic storage system of claim 1, wherein the enclosure assembly further comprises an enclosure and a padding component, wherein the padding component is disposed between the enclosure and the outer dome.

3. The cryogenic storage system of claim 2, wherein the padding component is a gasket disposed in a recess of the enclosure.

4. The cryogenic storage system of claim 2, further comprising a plurality of padding components, the plurality of padding components including the padding component, the plurality of padding components disposed around an outer dome radially outer surface of the outer dome.

5. The cryogenic storage system of claim 4, wherein the padding component comprises a first padding portion coupled to the enclosure and a second padding portion disposed between the first padding portion and the radially outer surface of the outer dome, the first padding portion including a first stiffness that is greater than a second stiffness of the second padding portion.

6. The cryogenic storage system of claim 1, wherein the storage container is a spherical dewar that rotates in three-dimensions and only contacts a plurality of ball elements.

7. The cryogenic storage system of claim 1, wherein the storage container is a temperature-controlled spherical storage container with a temperature below an ambient temperature that is positioned within the spherical cavity of the enclosure assembly and having a payload area that is configured to passively stabilize in an upright position.

8. The cryogenic storage system of claim 7, wherein the temperature-controlled spherical storage container has a center of mass or gravity that is located at or near a bottom of the temperature-controlled spherical storage container and that returns the temperature-controlled spherical storage container to an upright or vertical position or maintains the temperature-controlled spherical storage container in the upright or vertical position when the enclosure assembly is tilted or rotated.

9. The cryogenic storage system of claim 8, wherein the temperature-controlled spherical storage container is suspended within the cavity and remains upright within the enclosure assembly regardless of an orientation of the enclosure assembly.

10. The cryogenic storage system of claim 9, wherein the temperature-controlled suspended spherical storage container freely rotates within the spherical cavity.

11. The cryogenic storage system of claim 7, wherein the temperature-controlled spherical storage container rotates or moves about within the spherical cavity of the enclosure assembly without impacting inner sides of the enclosure assembly.

12. The cryogenic storage system of claim 7, wherein the enclosure assembly has an outer frame and an inner frame.

13. The cryogenic storage system of claim 6, wherein the plurality of ball elements are evenly distributed across a top hemisphere of the outer dome and a bottom hemisphere of the outer dome.

14. The cryogenic storage system of claim 6, wherein a spring is connected to one or more of the plurality of ball elements.

* * * * *